US007905215B2

(12) United States Patent
Suzuki et al.

(10) Patent No.: US 7,905,215 B2
(45) Date of Patent: Mar. 15, 2011

(54) FUEL SUPPLY APPARATUS

(75) Inventors: Yoshihito Suzuki, Toyokawa (JP); Tsutomu Furuhashi, Okazaki (JP); Masahiro Yokoi, Kariya (JP); Jun Hasegawa, Komaki (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 12/478,104

(22) Filed: Jun. 4, 2009

(65) Prior Publication Data

US 2009/0301439 A1 Dec. 10, 2009

(30) Foreign Application Priority Data

Jun. 4, 2008 (JP) ................................ 2008-146468
Mar. 23, 2009 (JP) ................................ 2009-069754

(51) Int. Cl.
*F02M 37/04* (2006.01)
*F16K 31/02* (2006.01)
*H01H 47/00* (2006.01)

(52) U.S. Cl. .................... 123/446; 251/129.04; 361/152

(58) Field of Classification Search .................. 123/446, 123/506; 251/129.15, 129.18, 129.04; 361/152, 361/160, 179, 154
See application file for complete search history.

(56) References Cited

U.S. PATENT DOCUMENTS 5,375,575 A 12/1994 Ohishi et al.
5,377,068 A * 12/1994 Kaylor et al. ................ 361/154
5,650,909 A * 7/1997 Remele et al. ................ 361/154
5,691,680 A * 11/1997 Schrey et al. ................ 335/256
5,825,216 A * 10/1998 Archer et al. ................ 327/110
5,917,692 A * 6/1999 Schmitz et al. ............... 361/187
5,941,216 A * 8/1999 Arakawa ...................... 123/490
5,947,090 A * 9/1999 Maeda ......................... 123/490
5,959,825 A * 9/1999 Harcombe ..................... 361/154
5,986,871 A * 11/1999 Forck et al. .................. 361/160
6,123,092 A * 9/2000 Torii ............................... 137/1
6,142,124 A 11/2000 Fischer et al.
6,167,869 B1 * 1/2001 Martin et al. ................ 123/458
6,394,414 B1 * 5/2002 Breitling et al. ......... 251/129.04

(Continued)

FOREIGN PATENT DOCUMENTS

JP 9-100938 4/1997

(Continued)

OTHER PUBLICATIONS

Japanese Office Action dated Apr. 23, 2010, issued in corresponding Japanese Application No. 2009-069754, with English translation.

*Primary Examiner* — Thomas N Moulis
(74) *Attorney, Agent, or Firm* — Nixon & Vanderhye PC

(57) ABSTRACT

A fuel supply apparatus includes a movable unit, a coil, a drive circuit portion, and a drive control portion. The drive circuit portion energizes the coil with a drive electric current of a first value such that the movable unit is displaced from an opening-side position to a closing-side position. The drive circuit portion energizes the coil with the drive electric current of a second value that is smaller than the first value such that the movable unit is held at the closing-side position. The drive control portion controls the drive circuit portion to change the drive electric current from the first value to the second value while the movable unit is being displaced toward the closing-side position based on energization of the coil with the drive electric current of the first value.

11 Claims, 15 Drawing Sheets

U.S. PATENT DOCUMENTS

| | | | | |
|---|---|---|---|---|
| 6,483,689 | B1 * | 11/2002 | Koch et al. | 361/160 |
| 6,966,325 | B2 * | 11/2005 | Erickson | 137/1 |
| 7,240,666 | B2 | 7/2007 | Okamoto | |
| 7,284,370 | B2 * | 10/2007 | Tatsukawa | 60/324 |
| 7,299,790 | B2 | 11/2007 | Okamoto et al. | |
| 7,325,536 | B2 | 2/2008 | Okamoto | |
| 7,441,550 | B2 * | 10/2008 | Ludwig et al. | 123/520 |
| 7,546,832 | B2 | 6/2009 | Okamoto et al. | |
| 7,591,239 | B2 | 9/2009 | Okamoto | |
| 2009/0235900 | A1 | 9/2009 | Okamoto et al. | |

FOREIGN PATENT DOCUMENTS

| | | |
|---|---|---|
| JP | 09-151768 | 6/1997 |
| JP | 2000-136747 | 5/2000 |
| JP | 2007-146657 | 6/2007 |
| JP | 2007-231929 | 9/2007 |
| JP | 2007-327409 | 12/2007 |

* cited by examiner

COMPARISON EXAMPLE

FUEL SUPPLY APPARATUS

CROSS REFERENCE TO RELATED APPLICATION

This application is based on and incorporates herein by reference Japanese Patent Application No. 2008-146468 filed on Jun. 4, 2008 and Japanese Patent Application No. 2009-069754 filed on Mar. 23, 2009.

BACKGROUND OF THE INVENTION

1. Field of the Invention

The present invention relates to a fuel supply apparatus that includes a high-pressure pump and a controller that controls the high-pressure pump.

2. Description of Related Art

A high-pressure pump has a plunger and a pressurizer chamber, and the plunger is reciprocably movable such that the plunger compresses and pumps fuel that is suctioned by the pressurizer chamber. In the above, fuel compressed in the pressurizer chamber is metered based on valve-closing timing of an inlet valve. In other words, fuel in the pressurizer chamber is returned to a source, from which fuel is suctioned, during the inlet valve is opened after the plunger has started moving upward from a bottom dead center. When the inlet valve is closed, fuel is compressed in the pressurizer chamber.

The inlet valve is contactable with a needle that is fixed with a movable core by welding. Thus, the movable core and the needle move integrally and constitute a movable unit. When a coil is not energized and thereby a magnetic attractive force is not formed, the movable unit is urged toward the inlet valve or toward an opening-side position by a biasing force of a spring. As a result, the inlet valve is opened.

In order to close the inlet valve that is opened as above, the energization is made in order to attract the movable unit toward a closing-side position or to move the movable unit in a direction away from the inlet valve. Due to the above, when the movable unit is displaced to the closing-side position, the inlet valve is closed due to a spring of the inlet valve and due to pressure of fuel in the pressurizer chamber located downstream of the inlet valve (see, for example, JP-A-H9-151768).

However, in the conventional art, when the movable unit is displaced toward the closing-side position, noise may be generated due to collision of the movable unit with another member. Sometimes, the noise may be so large that the noise may be noticeable to a driver disadvantageously.

SUMMARY OF THE INVENTION

The present invention is made in view of the above disadvantages. Thus, it is an objective of the present invention to address at least one of the above disadvantages.

To achieve the objective of the present invention, there is provided a fuel supply apparatus mounted on a vehicle, the apparatus including a receiver, a fuel passage, a valve member, a pressurizer chamber, a discharge unit, a movable unit, a coil, a drive circuit portion, and a drive control portion. The receiver receives fuel from an exterior. The fuel passage is communicated with the receiver. The valve member is provided in the fuel passage. The pressurizer chamber is located downstream of the fuel passage, and the pressurizer chamber receives fuel and compresses fuel in the pressurizer chamber. The discharge unit discharges fuel compressed in the pressurizer chamber. The movable unit is contactable with the valve member, and the movable unit is displaceable between a closing-side position and an opening-side position. The coil generates a magnetic attractive force attracting the movable unit. The drive circuit portion is adapted to energize the coil with a drive electric current such that the coil generates the magnetic attractive force. The drive circuit portion energizes the coil with the drive electric current of a first value such that the movable unit is displaced from the opening-side position to the closing-side position. The drive circuit portion energizes the coil with the drive electric current of a second value that is smaller than the first value such that the movable unit is held at the closing-side position. The drive control portion is adapted to control the drive circuit portion to change the drive electric current from the first value to the second value in order to displace the movable unit toward the closing-side position while the movable unit is being displaced toward the closing-side position based on energization of the coil with the drive electric current of the first value.

BRIEF DESCRIPTION OF THE DRAWINGS

The invention, together with additional objectives, features and advantages thereof will be best understood from the following description, the appended claims and the accompanying drawings in which:

DETAILED DESCRIPTION OF PREFERRED EMBODIMENTS

First Embodiment

Figure 1:
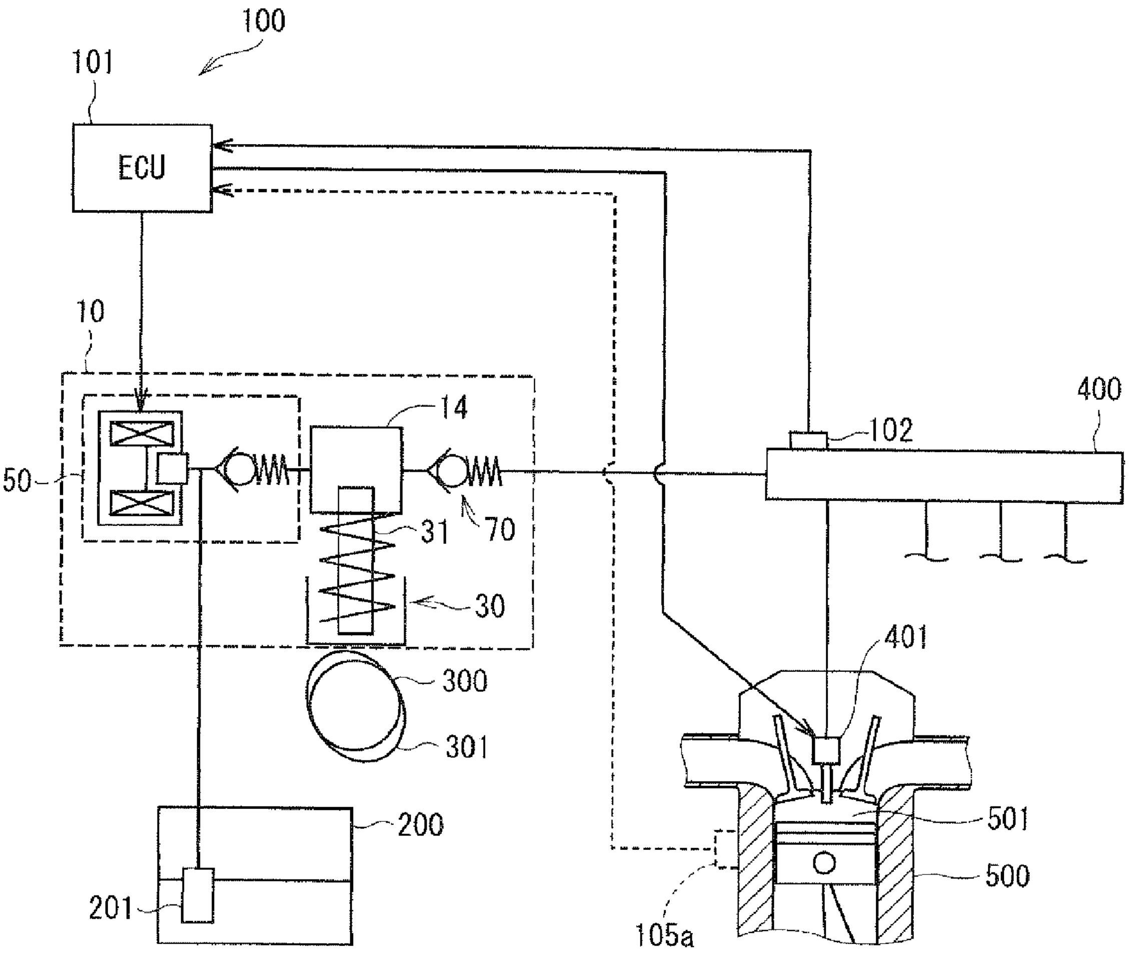
FIG. 1 is an explanatory diagram illustrating a general configuration including a fuel supply apparatus according to a first embodiment of the present invention.

FIG. 1 shows a general configuration that includes a fuel supply apparatus 100 according to the first embodiment of the present invention.

The fuel supply apparatus 100 of the present embodiment includes a high-pressure pump 10, an electronic control device (ECU) 101, and a fuel pressure sensor 102.

The high-pressure pump 10 includes a plunger unit 30, a metering valve unit 50, and a discharge valve unit 70. The high-pressure pump 10 compresses fuel that is pumped by a low-pressure pump 201 from a fuel tank 200, and the high-pressure pump 10 discharges the compressed fuel to a fuel rail 400. The high-pressure pump 10 defines therein a pressurizer chamber 14, in which fuel is compressed. Specifically, when a camshaft 300 having a cam 301 rotates, a plunger 31 is reciprocably displaced along a cam profile of the cam 301. As a result, a volume of the pressurizer chamber 14 is changed. Fuel is discharged to the fuel rail 400 through the discharge valve unit 70 in accordance with pressure of fuel in the pressurizer chamber 14. The fuel rail 400 is connected with multiple injectors 401. Each of the injectors 401 injects fuel into a combustion chamber 501 defined in a cylinder 500 of an engine.

The metering valve unit 50 adjusts an amount of fuel in the pressurizer chamber 14, and the ECU 101 controls energization of the metering valve unit 50. Because the ECU 101 is connected with the fuel pressure sensor 102 that is provided to the fuel rail 400, the ECU 101 controls the energization of the metering valve unit 50 based on fuel pressure in the fuel rail 400.

Figure 2:
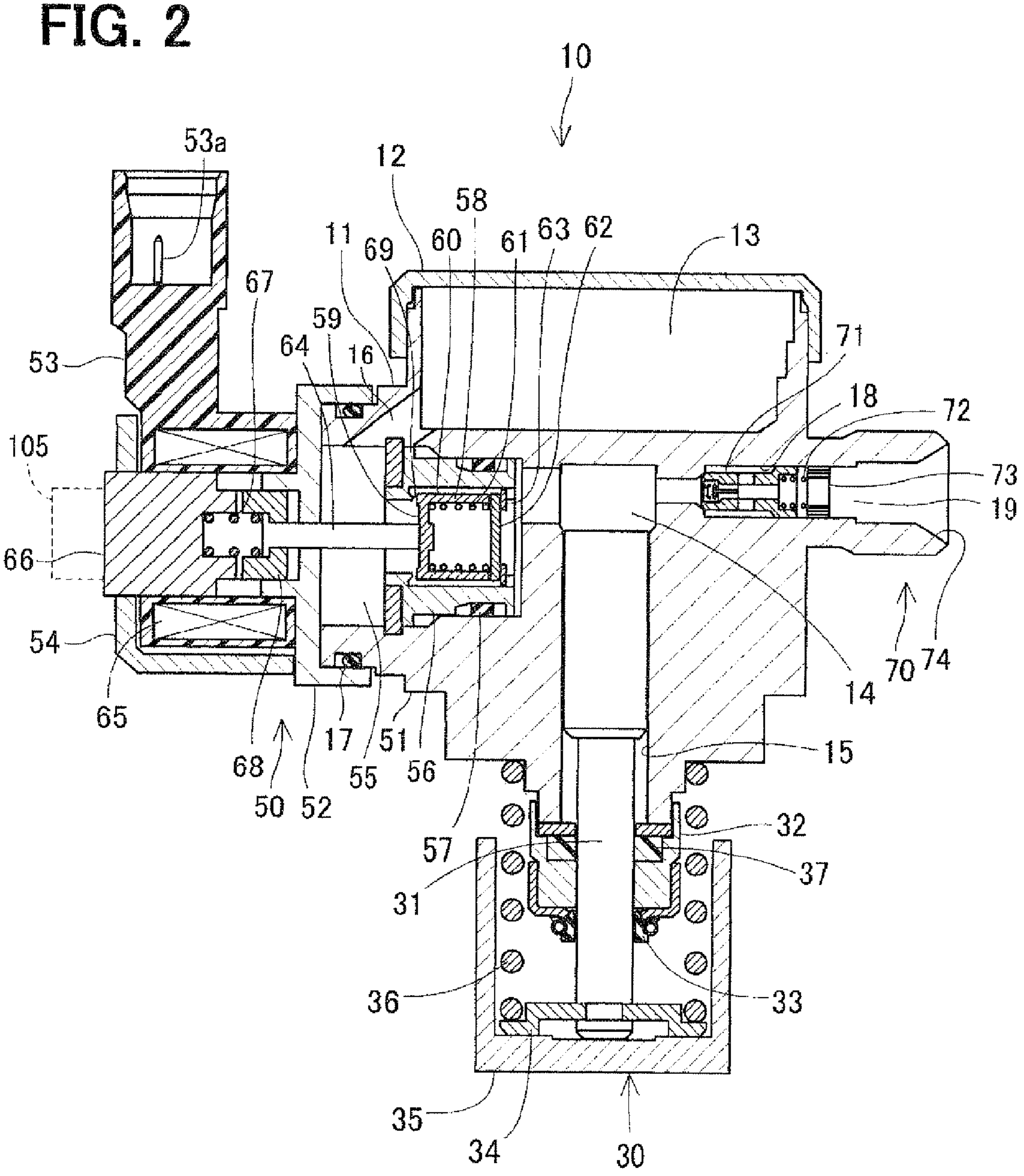
FIG. 2 is a schematic cross-sectional view illustrating a configuration of a high-pressure pump of the fuel supply apparatus according to the first embodiment of the present invention.

Next, a configuration of the high-pressure pump 10 will be described. FIG. 2 is a schematic cross-sectional view illustrating the configuration of the high-pressure pump 10.

As shown in FIG. 2, the high-pressure pump 10 mainly includes a housing body 11. The housing body 11 is made of, for example, martensitic stainless steel. A cover 12 is attached to one side of the housing body 11 (upper side in FIG. 2). Also, the plunger unit 30 is provided on the other side of the housing body 11 opposite from the cover 12. Also, the metering valve unit 50 and the discharge valve unit 70 are arranged in a direction that is orthogonal to a direction, in which the cover 12 and the plunger unit 30 are arranged.

A fuel chamber 13 serving as a "receiver" is defined between the housing body 11 and the cover 12 in a state, where the cover 12 is attached to the housing body 11. The fuel chamber 13 receives fuel that is supplied by the low-pressure pump 201 from the fuel tank 200 (see FIG. 1). The fuel thus supplied into the fuel chamber 13 is pumped via the interior of the metering valve unit 50, via the pressurizer chamber 14 provided around the center of the housing body 11, and via the discharge valve unit 70 (see FIG. 1), and then, is supplied to the fuel rail 400.

Next, the plunger unit 30, the metering valve unit 50, and the discharge valve unit 70 will be describe in turn.

Firstly, the plunger unit 30 will be described. The plunger unit 30 includes the plunger 31, a plunger supporter 32, an oil seal 33, a lower seat 34, a lifter 35, and a plunger spring 36.

The housing body 11 defines therein a cylinder 15. The cylinder 15 receives therein the plunger 31 such that the plunger 31 is reciprocably displaceable within the cylinder 15 in a longitudinal direction of the plunger 31. The plunger supporter 32 is provided at a longitudinal end of the cylinder 15. Thus, the plunger supporter 32 and the cylinder 15 support the plunger 31 such that the plunger 31 is reciprocable in the longitudinal direction.

The plunger 31 has one end adjacent the pressurizer chamber 14 and the other end remote from the pressurizer chamber 14. The one end of the plunger 31 has an outer diameter similar to an inner diameter of the cylinder 15. The other end of the plunger 31 has a diameter smaller than that of the one end of the plunger 31. The plunger supporter 32 has a fuel seal 37 provided inside the plunger supporter 32. The fuel seal 37 limits fuel leakage from the pressurizer chamber 14 to the engine. Also, the plunger supporter 32 has the oil seal 33 provided at an end of the plunger supporter 32. The oil seal 33 limits oil from entering into the pressurizer chamber 14 from the engine.

The lower seat 34 is attached to the other end portion of the plunger 31 remote from the pressurizer chamber 14, and the lower seat 34 integrates the lifter 35 with the plunger 31. The lifter 35 is a hollow cylinder having an opening end on one side thereof and receives therein the plunger spring 36. The plunger spring 36 has one end engaged with the housing body 11 and has the other end engaged with the lower seat 34.

In the above configuration, the lifter 35 is in contact with a contact surface of the cam 301, which is provided below the lifter 35, and which is attached to the camshaft 300 (see FIG. 1). Thus, the lifter 35 is reciprocably displaceable in the longitudinal direction in accordance with the cam profile of the cam 301 when the camshaft 300 rotates. Accordingly, the plunger 31 is reciprocably displaceable in the longitudinal direction. The plunger spring 36 is a return spring of the plunger 31 and urges the lifter 35 toward the contact surface of the cam 301.

Next, the metering valve unit 50 will be described.

The metering valve unit 50 includes a tubular portion 51, a valve unit cover 52, a connector 53, and a connector housing 54. The tubular portion 51 is a part of the housing body 11, and the valve unit cover 52 covers an opening of the tubular portion 51.

The tubular portion 51 has a generally hollow cylindrical shape, and defines therein a fuel passage 55 and a communication passage 16 that communicates the fuel passage 55 with the fuel chamber 13. Also, a rubber seal 17 is provided at an outer periphery of the tubular portion 51 in order to limit fuel leakage from the fuel passage 55. The fuel passage 55 receives therein a seat body 56 that has a generally hollow cylindrical shape. The seat body 56 has a rubber seal 57 provided at an outer periphery of the seat body 56, and the rubber seal 57 seals a clearance between the seat body 56 and an inner wall of the tubular portion 51. Due to the above configuration, fuel flows inside the seat body 56.

The seat body 56 receives therein an inlet valve 58. The inlet valve 58 has a disc-shaped bottom portion 59 and a hollow cylindrical wall portion 60. The bottom portion 59 and the wall portion 60 define therein an inner space, in which a spring 61 is received. The spring 61 has an end portion that is engaged or stopped by an engaging portion 62 that is located on a side of the inlet valve 58 toward the pressurizer chamber 14. It should be noted that the engaging portion 62 is engaged with a snap ring 63 that is attached to an inner wall of the seat body 56.

Also, the bottom portion 59 of the inlet valve 58 contacts a needle 64. The needle 64 extends through the valve unit cover 52 and reaches a position inside the connector 53. The connector 53 has a coil 65 and a terminal 53*a* that is used to energize the coil 65. A stationary core 66, a spring 67, and a movable core 68 are provided at positions radially inward of the coil 65. The stationary core 66 is held at a predetermined position. The movable core 68 is fixed to the needle 64 by welding. In other words, the movable core 68 is integral with the needle 64. Also, the spring 67 has one end that is engaged with the stationary core 66 and has the other end that is engaged with the movable core 68.

Due to the above configuration, when the terminal 53*a* of the connector 53 is energized, the coil 65 generates a magnetic flux that causes a magnetic attractive force formed between the stationary core 66 and the movable core 68. As a result, the movable core 68 is moved toward the stationary core 66, and thereby the needle 64 is moved in a direction away from the pressurizer chamber 14. As a result, the inlet valve 58 becomes movable without limitation imposed by the needle 64. Accordingly, the bottom portion 59 of the inlet valve 58 is movable to contact a seat part 69 of the seat body 56. Thus, when the inlet valve 58 is seated on the seat part 69, the fuel passage 55 is discommunicated from the pressurizer chamber 14. In contrast, when the terminal 53*a* of the connector 53 is deenergized, the magnetic attractive force disappears, and thereby a biasing force of the spring 67 urges the movable core 68 to move in a direction away from the stationary core 66. As a result, the needle 64 moves toward the pressurizer chamber 14, and thereby the inlet valve 58 moves toward the pressurizer chamber 14. In the above case, the bottom portion 59 of the inlet valve 58 is detached from the seat part 69, and thereby the fuel passage 55 is communicated with the pressurizer chamber 14.

Next, the discharge valve unit 70 will be described. The discharge valve unit 70 has a receiving portion 18, a valve element 71, a spring 72, an engaging portion 73, and a discharge port 74. The receiving portion 18 is a cylindrical bore formed at the housing body 11.

The receiving portion 18 defines therein a receiving chamber 19. The receiving chamber 19 receives therein the valve element 71, the spring 72, and the engaging portion 73. The valve element 71 is urged toward the pressurizer chamber 14 by a biasing force of the spring 72 that has one end engaged with the engaging portion 73. Due to the above configuration, the valve element 71 closes an opening of the receiving chamber 19, which opens to the pressurizer chamber 14, while pressure of fuel in the pressurizer chamber 14 is low. As a result, the pressurizer chamber 14 is disconnected from the receiving chamber 19. In contrast, when pressure of fuel in the pressurizer chamber 14 becomes greater, and thereby the fuel pressure exceeds the sum of the biasing force of the spring 72 and pressure of fuel in the fuel rail 400, the valve element 71 moves toward the discharge port 74. For example, the valve element 71 defines therein a space, through which fuel passes. When the fuel flows into the pressurizer chamber 14, fuel is flows through the internal space of the valve element 71 and is discharged through the discharge port 74. In other words, the valve element 71 functions as a check valve that is capable of stopping and allowing discharge of fuel.

Next, a block configuration of the fuel supply apparatus will be described with reference to FIG. 3.

As above, the fuel supply apparatus 100 includes the ECU 101. The ECU 101 is electrically connected to the terminal 53*a* of the connector 53 and controls energization of the coil 65. In other words the ECU 101 controls the displacement of the needle 64 of the metering valve unit 50.

The fuel supply apparatus 100 includes the ECU 101 and the fuel pressure sensor 102. For example, the ECU 101 is a microcomputer that has a CPU, a ROM, a RAM, an I/O, and a bus line connecting therebetween. The ECU 101 of the present embodiment has a fuel pressure controller 103 and a drive circuit 104.

The fuel pressure sensor 102 is a sensor for measuring a pressure of fuel that is discharged from the discharge port 74 (see FIG. 2). Accordingly, as above, the fuel pressure sensor 102 is provided to the fuel rail 400 that is located downstream of the discharge port 74 of the discharge valve unit 70. The fuel pressure sensor 102 is not limited to be provided to the fuel rail 400, but may be alternatively located at any position provided that the fuel pressure sensor 102 is capable of measuring or sensing pressure of pumped fuel. Then, the fuel pressure controller 103 receives signals from the fuel pressure sensor 102.

The fuel pressure controller 103 controls the drive circuit 104 based on the signals from the fuel pressure sensor 102 such that fuel pressure becomes a target pressure. The drive circuit 104 is capable of energizing the high-pressure pump 10 with different drive electric currents (two values) in accordance with a drive signal from the fuel pressure controller 103.

Next, an operation of the high-pressure pump 10 will be described with reference to FIG. 4.

When the camshaft 300 shown in FIG. 1 rotates, the plunger 31 is reciprocably moved in the longitudinal direction as described above. The plunger 31 is reciprocable between a top dead center and a bottom dead center, and a position of the plunger 31 is indicated as a "cam lift" as shown in FIG. 4. In the present embodiment, (1) intake stroke, (2) return stroke, and (3) compression stroke in the operation will be separately described.

(1) Intake Stroke

While the plunger 31 is displaced toward the bottom dead center or is displaced downward in FIG. 2, the energization of the coil 65 is stopped. The above displacement occurs in a range from a cam angle of A to a cam angle of B in FIG. 4. In other words, the above displacement occurs in a range from the top dead center to the bottom dead center. Therefore, the inlet valve 58 is urged by the needle 64 that is integral with the movable core 68, which is biased by the spring 67, and thereby the inlet valve 58 is displaced toward the pressurizer chamber 14. As a result, the inlet valve 58 is detached from or spaced from the seat part 69 of the seat body 56, and thereby the fuel chamber 13 is communicated with the pressurizer chamber 14. In the above state, the movable core 68 and the needle 64 are located at an "opening-side position". Also, at this time, pressure in the pressurizer chamber 14 is reduced. Accordingly, fuel in the fuel chamber 13 is suctioned into the pressurizer chamber 14.

(2) Return Stroke

When the plunger 31 starts moving from the bottom dead center toward the top dead center or starts moving upward in FIG. 2, fuel pressure in the pressurizer chamber 14 increases, and thereby the inlet valve 58 receives a force in a direction caused by fuel in the pressurizer chamber 14 such that the inlet valve 58 is urged to be seated on the seat part 69 of the seat body 56. The above upward movement of the plunger 31 occurs in a range from the cam angle of B to a cam angle of D in FIG. 4. In other words, above upward movement of the plunger 31 occurs in a range from the bottom dead center to the top dead center. Because the inlet valve 58 is detached from the seat part 69 of the seat body 56 and thereby the inlet valve 58 is opened as above, the upward movement of the plunger 31 causes fuel in the pressurizer chamber 14 to flow back to the fuel chamber 13, in contrast to the suction of the fuel in the intake stroke.

(3) Compression Stroke

When the coil 65 is energized during the return stroke, the magnetic field generated by the coil 65 forms a magnetic circuit. Accordingly, the magnetic attractive force is generated between the stationary core 66 and the movable core 68. When the magnetic attractive force generated between the stationary core 66 and the movable core 68 becomes greater than the biasing force of the spring 67, the movable core 68 is displaced toward the stationary core 66. Thereby, the needle 64 that is integral with the movable core 68 is also displaced toward the stationary core 66, and as a result, the inlet valve 58 is moved apart from the needle 64. In the above state, the movable core 68 and the needle 64 are located at a "closing-side position". As a result, the inlet valve 58 receives the biasing force of the spring 61 and pressure of fuel in the pressurizer chamber 14, and thereby the inlet valve 58 becomes seated on the seat part 69 of the seat body 56. The above operation corresponds to the cam angle of C in FIG. 4.

When the inlet valve 58 is seated on the seat part 69, the fuel chamber 13 is disconnected from the pressurizer chamber 14. The above disconnection ends the return stroke, in which fuel flows from the pressurizer chamber 14 to the fuel chamber 13. Accordingly, by adjusting timing of performing the disconnection, an amount of fuel that is returned from the pressurizer chamber 14 to the fuel chamber 13 is adjusted, and also an amount of fuel that is compressed in the pressurizer chamber 14 is determined.

When the plunger 31 moves further toward the top dead center in a state, where the pressurizer chamber 14 is disconnected from the fuel chamber 13, fuel pressure in the pressurizer chamber 14 further increases. The above further displacement of the plunger 31 corresponds to a range from the cam angle of C to the cam angle of D in FIG. 4. When fuel pressure in the pressurizer chamber 14 becomes equal to or greater than a predetermined pressure, the valve element 71 of the discharge valve unit 70 is displaced in a direction away from the pressurizer chamber 14. Due to the above configuration, the pressurizer chamber 14 becomes communicated with the receiving chamber 19, and thereby fuel compressed in the pressurizer chamber 14 is discharged through the discharge port 74. The fuel discharged through the discharge port 74 is supplied to the injector 401 via the fuel rail 400 shown in FIG. 1.

When the plunger 31 reaches the top dead center (corresponding to the cam angle of D in FIG. 4), the plunger 31 starts moving toward the bottom dead center or moves downwardly in FIG. 2.

It should be noted that when fuel pressure in the pressurizer chamber 14 reaches the predetermined value, the coil 65 is deenergized. When fuel pressure in the pressurizer chamber 14 increases, fuel on a side of the inlet valve 58 adjacent the pressurizer chamber 14 holds the inlet valve 58 seated on the seat part 69 of the seat body 56.

By repeating the above strokes (1) to (3), the high-pressure pump 10 compresses suctioned fuel and discharges the compressed fuel. The discharge amount of fuel is adjusted by adjusting timing of energizing the coil 65 of the metering valve unit 50.

The operation of the high-pressure pump 10 has been described as above. The present embodiment is characterized in timing of energizing the high-pressure pump 10. Thus, the characteristic of the present embodiment will be described in comparison with a comparison example.

Figure 4:
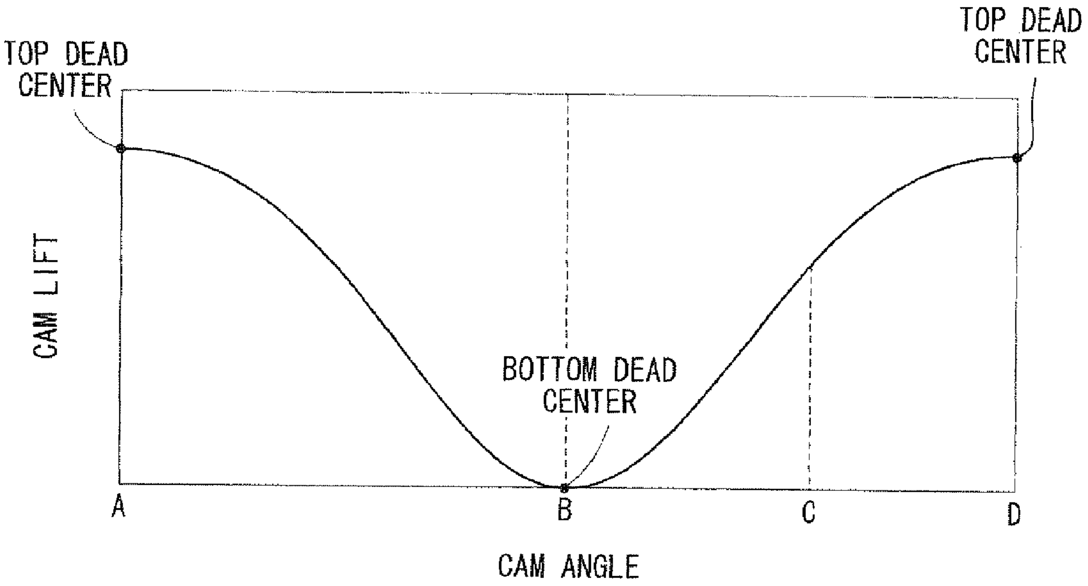
FIG. 4 is an explanatory diagram illustrating an operation of the high-pressure pump of the fuel supply apparatus of the first embodiment of the present invention.
Figure 5:
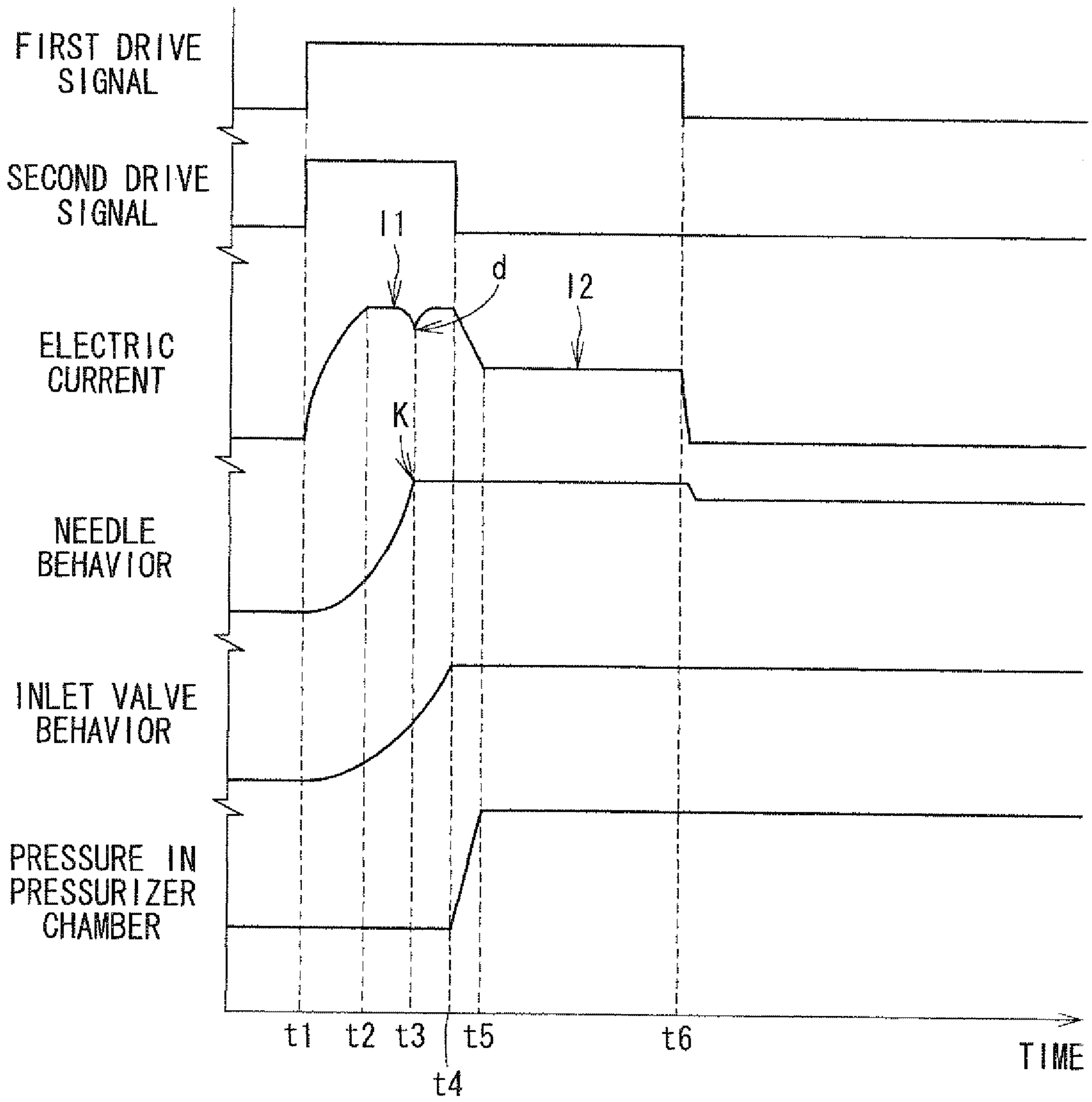
FIG. 5 is an explanatory diagram illustrating an operation of a fuel supply apparatus of a comparison example.

FIG. 5 is an explanatory diagram illustrating a comparison example. The explanatory diagram corresponds to a valve-closing operation of the inlet valve 58 at the cam angle of C in FIG. 4, and the inlet valve 58 is closed at time t4 (see "inlet valve behavior" of FIG. 5).

As appreciated from FIG. 5, firstly, two different drive signals, such as a first drive signal, a second drive signal, are outputted (see "first drive signal" and "second drive signal" of FIG. 5). Then, the energization is made based on the drive signals in order to generate the attractive force to attract the movable core 68 (see "electric current" of FIG. 5). Thus generated attractive force moves the needle 64, and thereby the needle 64 that is integral with the movable core 68 reaches the closing side position. Then, the inlet valve 58 is closed (see "needle behavior" of FIG. 5).

Figure 3:
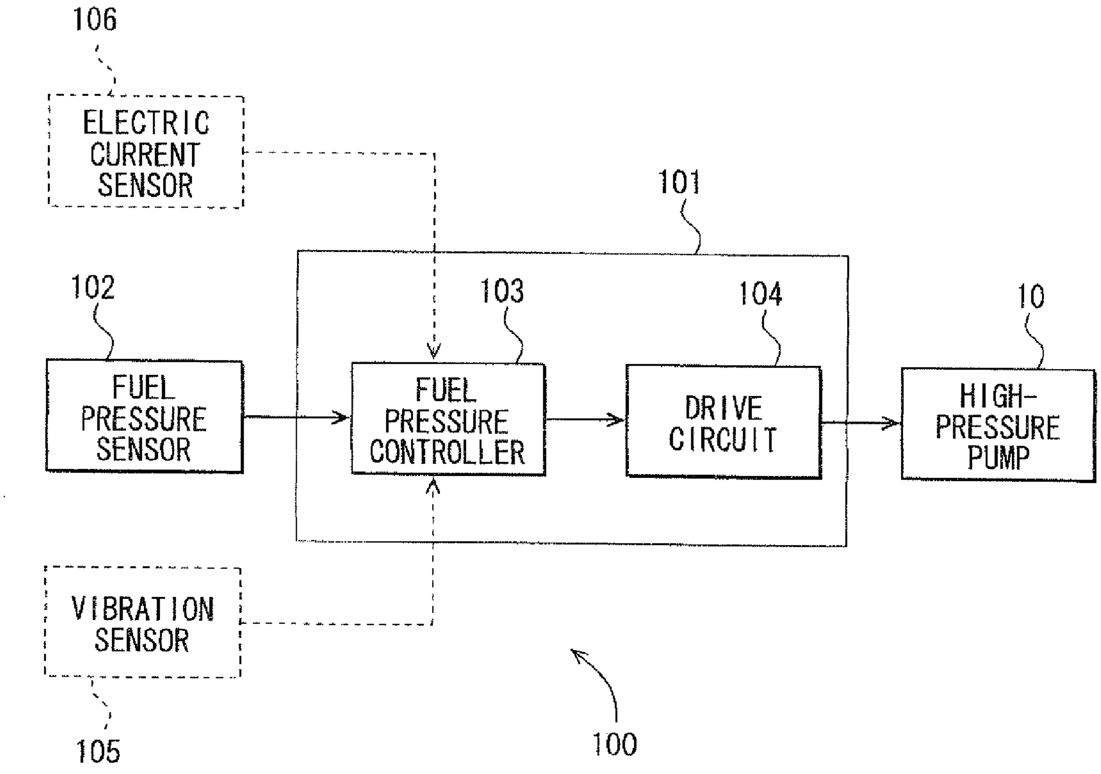
FIG. 3 is a block diagram illustrating the fuel supply apparatus of the first embodiment of the present invention.

The fuel pressure controller 103 of the ECU 101 shown in FIG. 3 outputs the first drive signal and the second drive signal to the drive circuit 104. Then, the drive circuit 104 energizes the high-pressure pump 10. The drive circuit 104 supplies a drive electric current that is changed in accordance with the first drive signal and the second drive signal from the fuel pressure controller 103. More specifically, the drive circuit 104 supplies the drive electric current to the high-pressure pump 10 while the first drive signal is at a high level. In the above case, when the second drive signal indicates a high level, the drive circuit 104 energizes the high-pressure pump 10 with a first drive electric current that is relatively large. The first drive electric current corresponds to "the drive electric current of a first value (I1 in FIG. 5)". In contrast, when the second drive signal indicates a low level, the drive circuit 104 energizes the high-pressure pump 10 with a second drive electric current that is relatively small. The second drive electric current corresponds to "the drive electric current of a second value (I2 in FIG. 5)" that is smaller than the first value. In detail, the first drive electric current is sufficient enough to displace the movable core 68 and the needle 64 from the "opening-side position" to the "closing-side position". Also, the second drive electric current is sufficient enough to hold the movable core 68 and the needle 64 at the "closing-side position" such that the inlet valve 58 remains closed. As above, the drive circuit 104 energizes the high-pressure pump 10 by switching the drive electric current between the first drive electric current and the second drive electric current (between the first value and the second value). For example, when the inlet valve 58 is closed based on the energization with the first drive electric current, it is possible to maintain the inlet valve 58 closed without the energization with the first drive electric current, because the fuel pressure in the pressurizer chamber 14 has increased substantially by the time of closing the valve 58. Thus, by energizing the high-pressure pump 10 with the second drive electric current, electric power consumption is saved effectively. Due to the above reason, the drive electric current is switched between the first drive electric current and the second drive electric current as necessary.

FIG. 5 will be described again. Because both the first drive signal and the second drive signal indicate the high level at time t1, the drive electric current of the drive circuit 104 starts rising at time t1. Then, during a period from time t2 to time t4, the drive circuit 104 energizes the high-pressure pump 10 with the first drive electric current (I1 in FIG. 5), and during another period from time t5 to time t6, the drive circuit 104 energizes the high-pressure pump 10 with the second drive electric current (I2 in FIG. 5). It should be noted that more specifically, the first drive electric current may be decreased temporarily as indicated by “d” in FIG. 5 in accordance with the behavior of the needle 64. When the drive circuit 104 starts energization at time t1, the magnetic attractive force is generated, and thereby the movable core 68 moves in a direction away from the pressurizer chamber 14. Accordingly, the needle 64 moves with the movable core 68. In FIG. 5, the movement of the needle 64 has completed at time t3. After the above, the inlet valve 58 that is not in contact with the needle 64 is closed at time t4 (see “inlet valve behavior” of FIG. 5), and thereby pressure in the pressurizer chamber 14 starts rising from time t4 (see “pressure in pressurizer chamber” of FIG. 5).

In the comparison example, the second drive signal becomes the low level at time t4, at which the inlet valve 58 gets closed. After this, the energization with the second drive electric current is performed during the period from time t5 to time t6 as above. The above operation is made because the inlet valve 58 is only required to be held closed once after the inlet valve 58 is moved to the valve-closing position.

However, in the comparison example, because the energization with the first drive electric current is maintained until time t4, at which the inlet valve 58 is fully closed, a travel speed of the needle 64 at time t3 may be relatively large. The travel speed of the needle 64 corresponds to an inclination of a part indicated by K in the needle behavior chart in FIG. 5. Thus, for example, collision noise may be generated due to the collision between the stationary core 66 and the movable core 68, and thereby noise of the needle 64 becomes larger disadvantageously in the comparison example.

Figure 6:
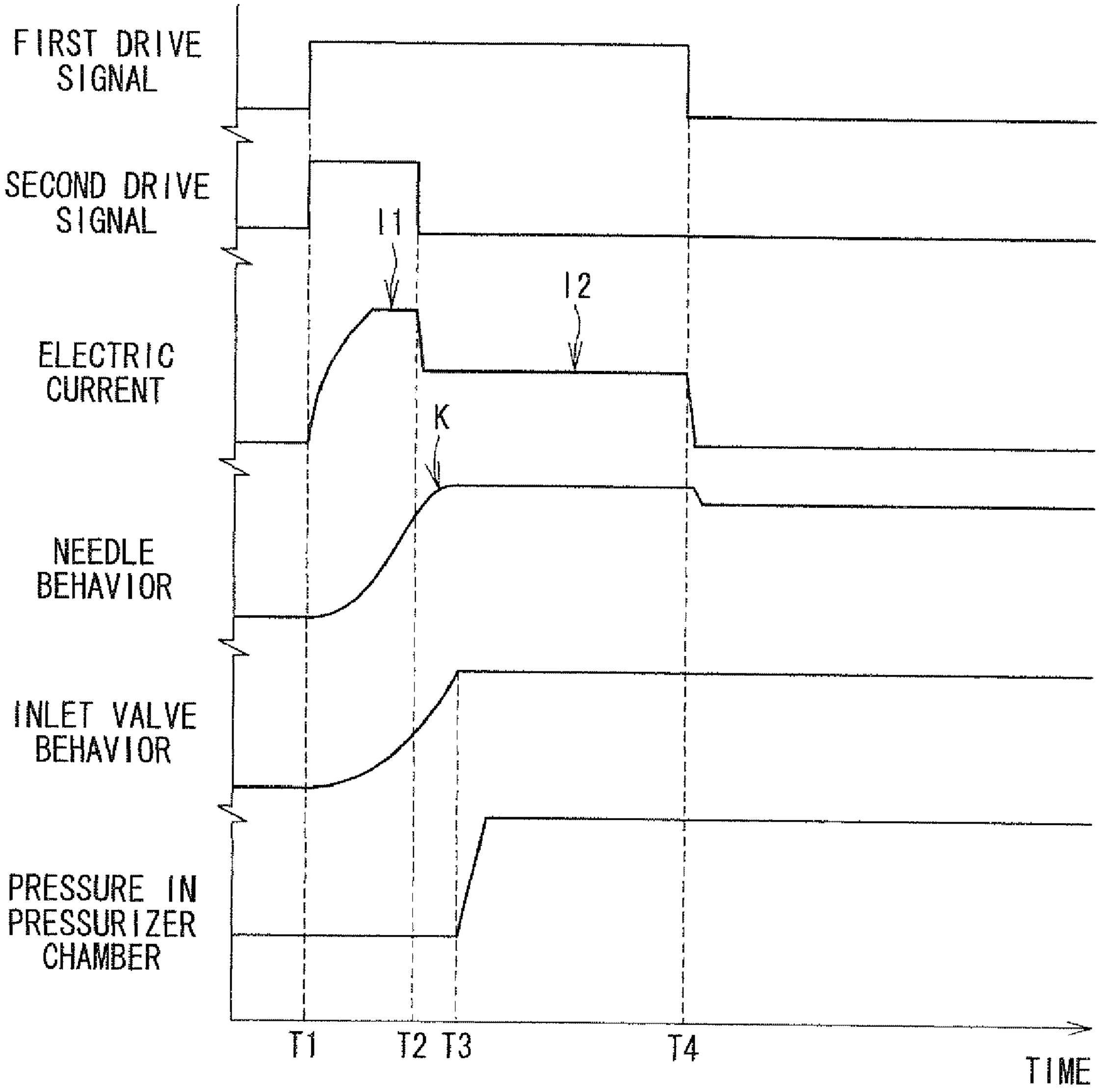
FIG. 6 is an explanatory diagram illustrating an operation of the fuel supply apparatus of the first embodiment of the present invention.

In order to address the above disadvantages, an energization time period, in which the high-pressure pump 10 is energized, is adjusted in the present embodiment. FIG. 6 is an explanatory diagram illustrating an operation of the fuel supply apparatus 100.

In the above comparison example, the second drive signal is turned to the low level from the high level at time t4, at which the inlet valve 58 is closed. In contrast, in the present embodiment, the second drive signal is turned to the low level at time T2, at which the movement of the needle 64 toward the closing-side position has not been fully completed yet. Due to the above, a travel speed of the needle 64 after time T2 is gradually reduced. The travel speed of the needle 64 corresponds to an inclination of a part indicated by K in the chart of the needle behavior in FIG. 6. The above operation may be referred as a “soft landing” of the needle 64. Due to the above, for example, the collision noise between the stationary core 66 and the movable core 68 is effectively limited, and thereby the noise of the needle 64 is effectively reduced in the present embodiment.

When an “energization time period”, during which the second drive signal is kept at the high level, becomes shorter, displacement completion timing, at which the displacement of the needle 64 toward the closing-side position has been completed, may be delayed or retarded. As a result, valve-closing timing of fully closing the inlet valve 58 may be delayed. When the valve-closing timing of the inlet valve 58 is delayed, a time period for the return stroke of the high-pressure pump 10 (see the operation (2)) may become longer, and a time period for the compression stroke of the high-pressure pump 10 (see the operation (3)) may become shorter accordingly. In sum, discharge by the high-pressure pump 10 may fail when the energization time period is excessively short.

Figure 7:
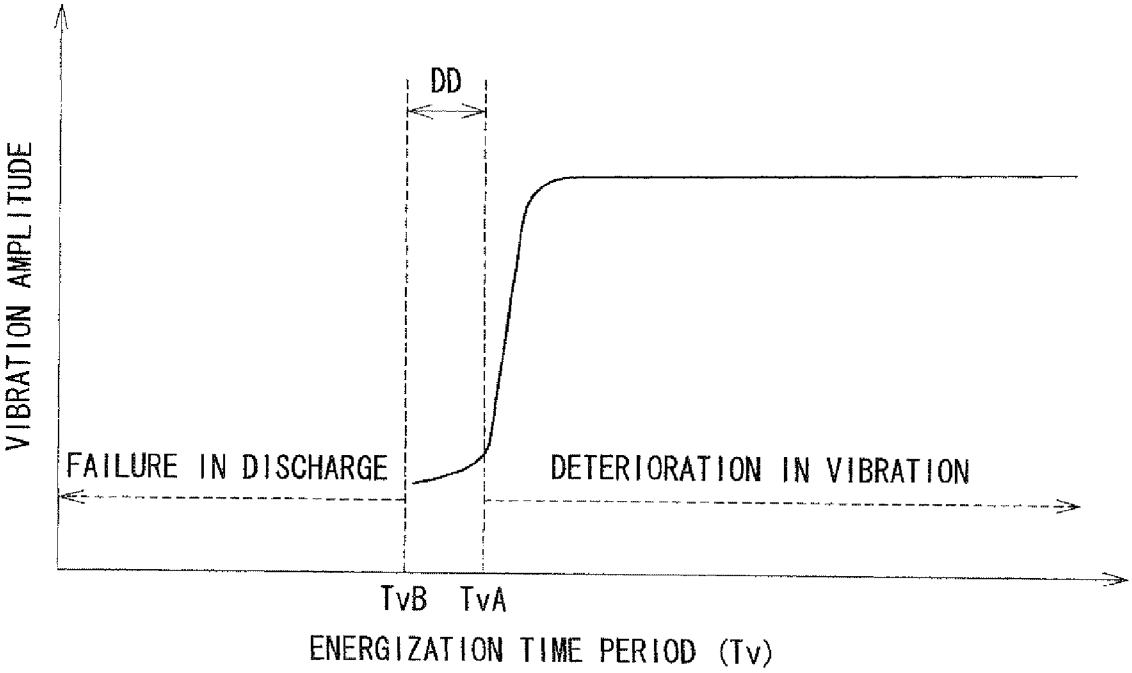
FIG. 7 is an explanatory diagram illustrating a relation between an energization time period and a vibration amplitude.

FIG. 7 is an explanatory diagram illustrating the above relation. According to FIG. 7, when the energization time period Tv exceeds TvA, a vibration amplitude sharply becomes larger or noise sharply becomes larger. However, when the energization time period is less than TvB, failure in the discharge by the high-pressure pump 10 may occur. Thus, in the present embodiment, the energization time period Tv is set such that the energization time period Tv stays within a range indicated by DD in FIG. 7. The setting of the energization time period Tv is executed by a learning control.

Next, the learning control of the energization time period Tv will be described. A control of the fuel pressure controller 103 illustrated in FIG. 3 will be detailed.

In the ECU 101, the fuel pressure controller 103 receives a signal from the fuel pressure sensor 102 that detects the fuel pressure, and the fuel pressure controller 103 outputs the first drive signal and the second drive signal to the drive circuit 104. The fuel pressure controller 103 makes both the first drive signal and the second drive signal at the high level at time T1 in FIG. 6 in order to close the inlet valve 58. The above timing of starting energization of the drive circuit 104 is defined as energization start timing that corresponds to time T1. The energization start timing is feed-back controlled such that the fuel pressure detected by the fuel pressure sensor 102 becomes the target pressure. Thus, when the fuel pressure detected by the fuel pressure sensor 102 decreases, time t1 advances. In other words, the energization start timing is made to come earlier.

Hereinafter, the energization start timing, at which the first drive signal and the second drive signal from the fuel pressure controller 103 becomes the high level, is represented by “spill valve closing timing epduty”. It should be noted that the spill valve closing timing epduty corresponds to a cam angle (BTDC) that is based on the top dead center indicated as D in FIG. 4. For example, in FIG. 4, cam angle “D” corresponds to 0° CA and cam angle “A” corresponds to 180° CA indicating one cycle in a case, where the camshaft has two cams. Cam angle “A” is not limited to 180° CA but may be a different value depending on the number of cams. For example, cam angle “A” is 120° CA in another case, where the camshaft has three cams. Thus, when the energization start timing T1 advances, the cam angle indicated by BTDC advances in a direction from D to A in FIG. 4. Thus, the spill valve closing timing epduty becomes greater when the energization start timing T1 becomes earlier or advances. In contrast, the spill valve closing timing epduty becomes smaller when the energization start timing T1 becomes delayed or retarded. The spill valve closing timing epduty corresponds to “energization start timing”.

In the present embodiment, the above configuration is applied. The energization time period Tv is gradually shortened from an initial value during a period from E0 to E1 in FIG. 8. The initial value may be set as a maximum value of the energization time period Tv, to which the initial value is changeable to the most. For example, the initial value may be set as a period from time t1 to time t4 of the comparison example illustrated in FIG. 5.

The shorter the energization time period Tv becomes, the earlier the second drive signal is changed to the low level from the high level. In other words, if the energization time period Tv is made shorter, a period before the second drive signal is switched to the low level from the high level is made shorter. Also, as described in the description of FIG. 6, when the energization time period is made short enough such that the second signal is changed to the low level from the high level before the displacement of the needle 64 is completed, valve-closing timing of the inlet valve 58 is delayed. As a result, the discharge amount is reduced, and thereby the fuel pressure detected by the fuel pressure sensor 102 is reduced. In the above case, the spill valve closing timing epduty is feed-back controlled to become larger during a period from E1 to E2 in FIG. 8. In other words, the "advancing" of the spill valve closing timing epduty is executed.

Furthermore, when the energization time period Tv is shortened further to a threshold value, the "advancing" of the spill valve closing timing epduty may not work to maintain the fuel pressure at a certain range. As a result, the fuel pressure may not be maintained at the target pressure (corresponding to E2 in FIG. 8).

As illustrated in FIG. 7, the spill valve closing timing epduty starts increasing when the energization time period Tv is shortened to a certain value in order to change the second drive signal to the low level before the displacement of the needle 64 is completed. The above certain value approximately corresponds to the energization time period TvA in FIG. 7. For example, when the energization time period Tv is reduced from a larger value to become smaller than the energization time period TvA, vibration sharply decreases. Also, when the energization time period Tv is further reduced, the fuel pressure starts decreasing even when the "advancing" of the spill valve closing timing epduty is executed. Thus, the threshold value of the energization time period corresponds to an energization time period TvB in FIG. 7.

Figure 8:
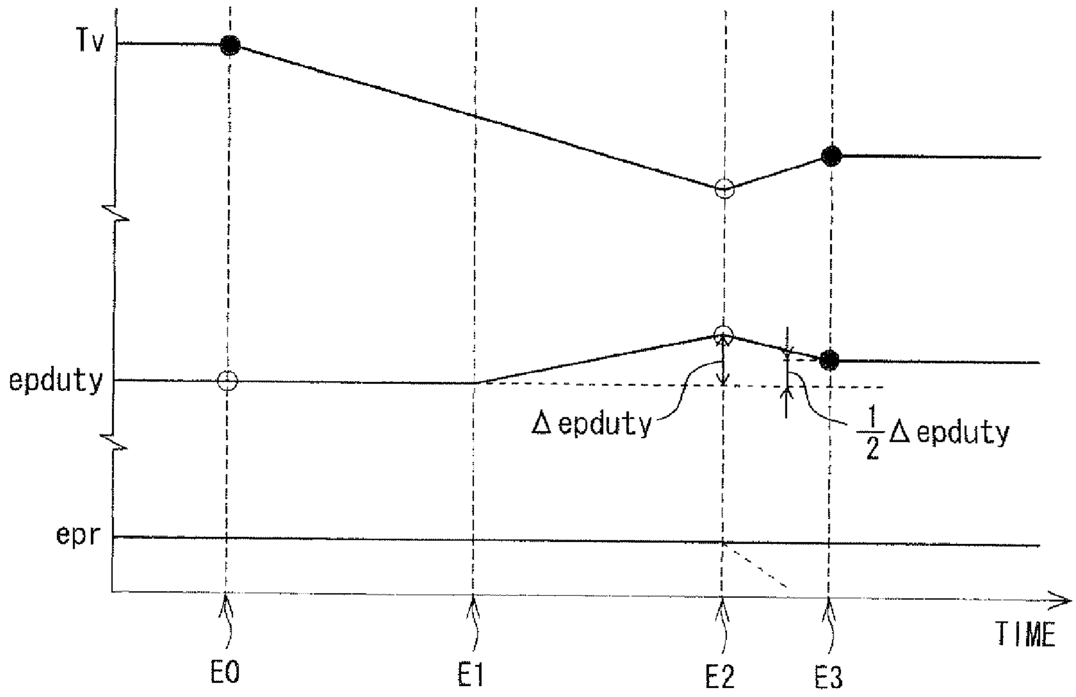
FIG. 8 is an explanatory diagram illustrating a learning control of the first embodiment of the present invention.

In the present embodiment, the energization time period Tv at timing E2 in FIG. 8 is learned in a provisional learning operation. Then, in a main learning operation, the energization time period Tv is increased based on a half of an increase Δepduty of the spill valve closing timing epduty measured between E1 and E2 in FIG. 8. As a result, the energization time period Tv is set as a value that is approximately in a middle of the range DD in FIG. 7.

Figure 9:
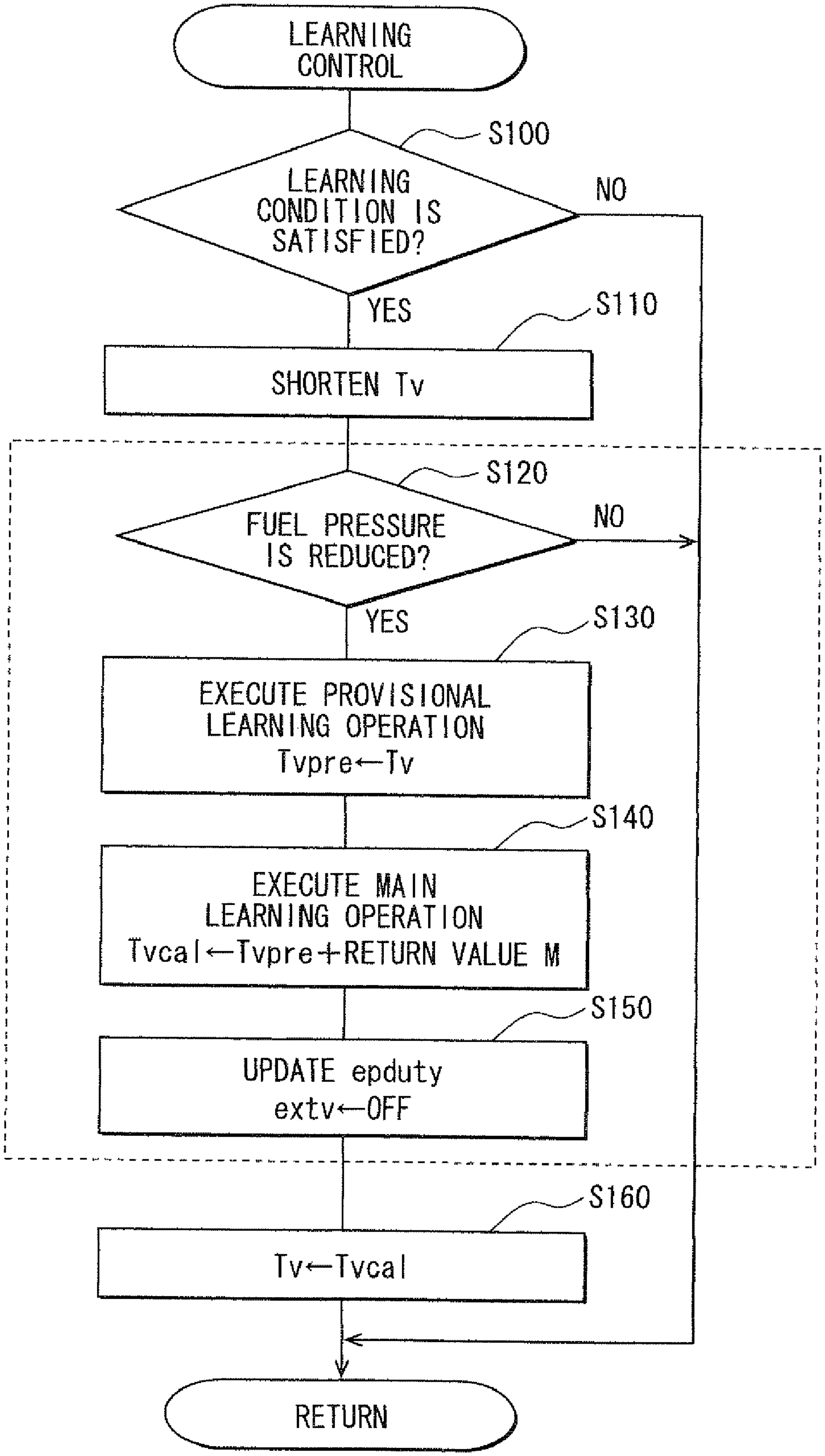
FIG. 9 is a flow chart illustrating a learning control of the first embodiment of the present invention.

The above learning control of the present embodiment will be described with reference to a flow chart in FIG. 9. The process in the flow chart in FIG. 9 is repeated at predetermined intervals in the present embodiment.

At S100, it is determined whether a learning condition is satisfied. The above determination at S100 depends on whether a learning flag extv is ON. The learning flag extv is set as or turned to ON when the learning condition is satisfied in a process described later. When it is determined that the learning flag extv is ON, corresponding to YES at S100, control proceeds to S110, where the energization time period Tv is shortened. More specifically, at S110, the energization time period Tv is updated by subtracting a predetermined value from the current energization time period Tv. Then, control proceeds to S120. In contrast, when it is determined that the learning flag extv is OFF, corresponding to NO at S100, the learning control is ended.

At S120, it is determined whether the fuel pressure (epr) starts decreasing. The above determination process is made in order to determine timing E2 in FIG. 8. When it is determined that the fuel pressure starts decreasing, corresponding to YES at S120, control proceeds to S130. In contrast, when it is determined that the fuel pressure is maintained at a constant value, corresponding to NO at S120, learning control is ended.

At S130, a provisional learning operation is executed. In the provisional learning operation, a provisional learning value Tvpre is set equivalent to the current energization time period Tv. Then, control proceeds to S140, where the main learning operation is executed. In the main learning operation, a main learning value Tvcal is obtained by adding a return value M to the provisional learning value Tvpre. For example, the return value M corresponds to the half of the increase Δepduty of the spill valve closing timing epduty measured between E1 and E2 in FIG. 8.

Then, control proceeds to S150, where the spill valve closing timing epduty is updated. More specifically, the changed spill valve closing timing epduty is stored because the spill valve closing timing epduty is "advanced". Also, the learning flag extv is turned to OFF.

Then, control proceeds to S160, where a new energization time period Tv is set as the learning value Tvcal. Then, the learning control is ended.

Then, a learning condition determination operation will be described with reference to FIG. 10. In the learning condition determination operation, it is determined whether the learning condition is satisfied. In other words, when it is determined that the learning condition is satisfied in the learning condition determination operation, the learning flag extv is set as ON.

At S200, it is determined whether the learning flag extv is ON. When it is determined that the learning flag extv is ON, corresponding to YES at S200, the following process is not executed, and the learning condition determination operation is ended. In contrast, when it is determined that the learning flag extv is OFF, corresponding to NO at S200, control proceeds to S210.

At S210, it is determined whether the engine is operated under a steady state operation. The above determination is made whether both an engine rotational speed and an engine load are equal to or less than predetermined values. Alternatively, the steady state operation may be determined depending one whether the engine is operated under a stand-by or idling operation. More specifically, it may be determined whether the vehicle speed is "0" while the accelerator pedal is not pressed. Furthermore, in order to determine the steady state operation, alternatively, it may be determined whether the fuel pressure is equal to or less than a predetermined value, or it may be determined whether a VCT is not driven. When it is determined that the engine is operated under the steady state operation, corresponding to YES at S210, control proceeds to S220. In contrast, when it is determined that the engine is not operated under the steady state operation, corresponding to NO at S210, the following process is not executed, and the learning condition determination operation is ended.

At S220, it is determined whether an engine coolant temperature is equal to or greater than a predetermined value S0. When it is determined that the engine coolant temperature≧S0, corresponding to YES at S220, control proceeds to S230, where the learning flag extv is set as ON, and then the learning condition determination operation is ended. In contrast, when it is determined that the engine coolant temperature<S0, corresponding to NO at S220, a process at S230 is not executed and the learning condition determination operation is ended.

Figure 10:
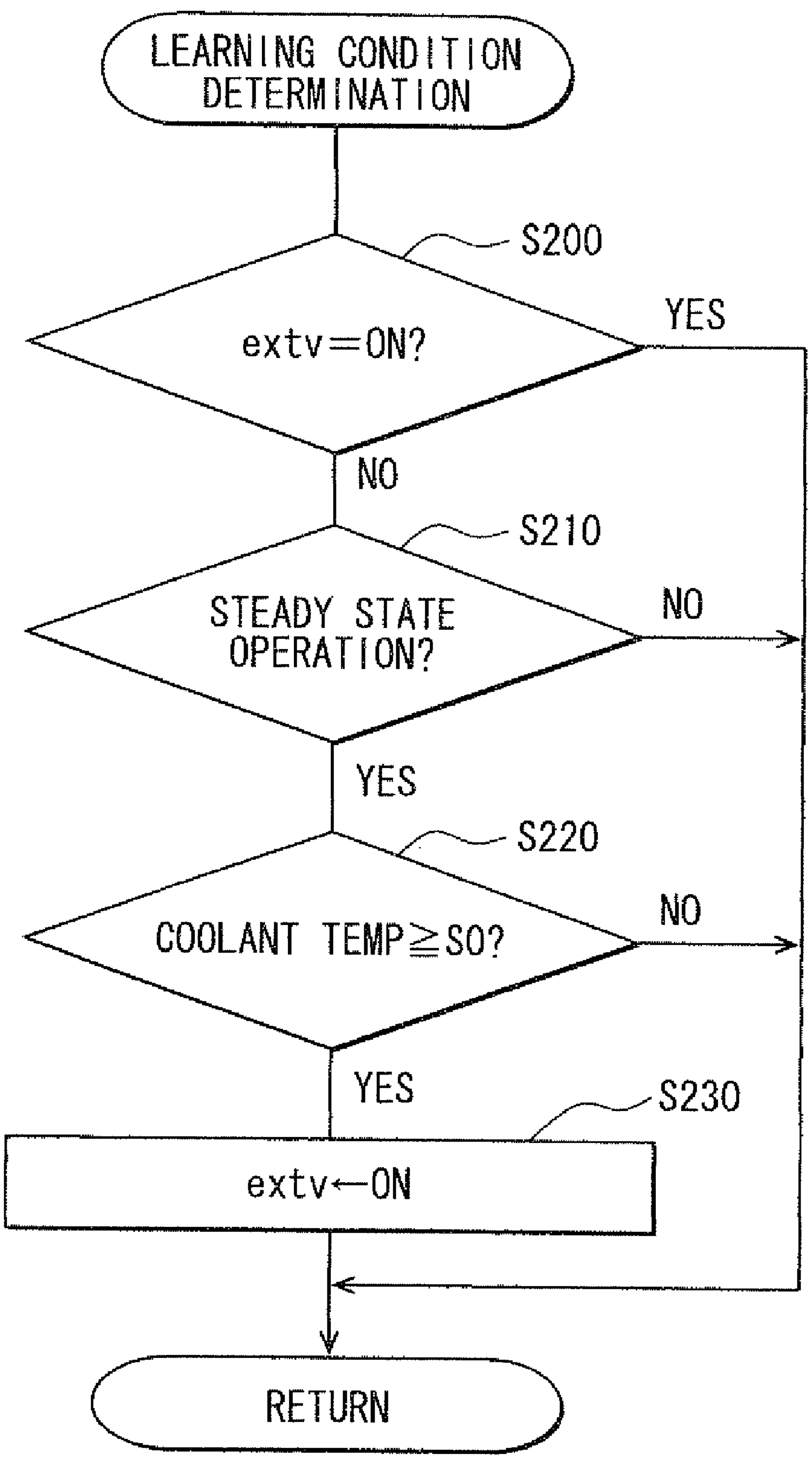
FIG. 10 is a flow chart illustrating a learning condition determination operation of the first embodiment of the present invention.

In the present embodiment, the learning operation is executed when the engine is operated under the steady state operation (S210 in FIG. 10). In other words, the condition for executing the learning operation includes that the engine is continuously operated under the steady state. The reason of having the above condition will be described below. Firstly, a (A) relation between the engine rotational speed and the learning condition will be described, and next, a (B) relation between the engine load and the learning condition will be described.

(A) Relation between Engine Rotational Speed and Learning Condition

Figure 11A:
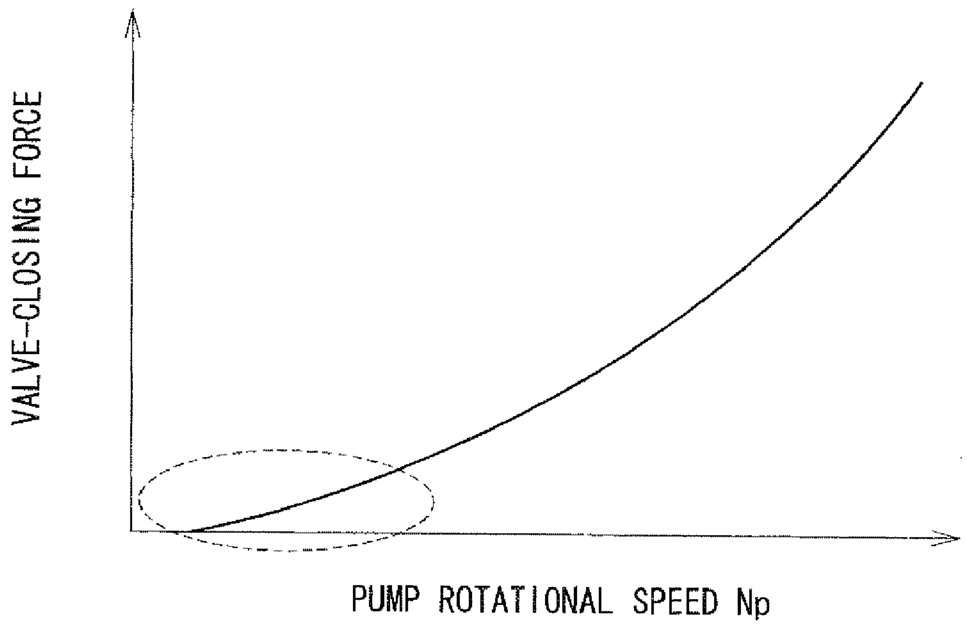
FIG. 11A is an explanatory diagram illustrating a relation between a pump rotational speed and a valve-closing force.
Figure 11B:
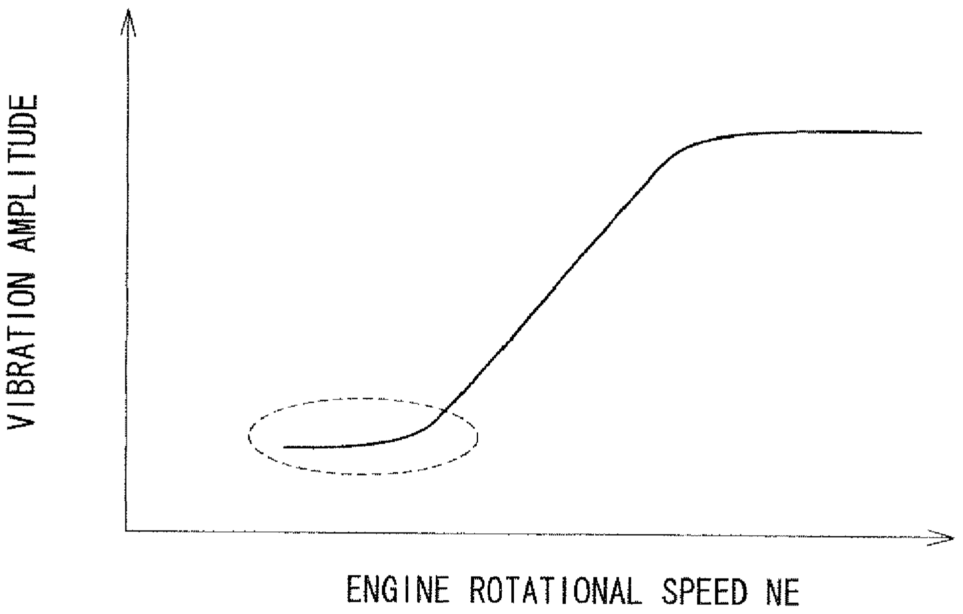
FIG. 11B is an explanatory diagram illustrating a relation between an engine rotational speed and a vibration amplitude.

As illustrated in FIG. 11A, it is known that when a pump rotational speed Np becomes higher, a valve-closing force that causes the inlet valve 58 to be closed becomes larger accordingly. The pump rotational speed Np may be a rotational speed of the camshaft. In other words, when the pump rotational speed Np becomes greater, a speed in increase of the pressure in the pressurizer chamber 14 caused by the plunger 31 becomes greater. As a result, the valve-closing force of the inlet valve 58 is increased. In general, the pump rotational speed Np is proportional to an engine rotational speed NE. As shown in FIG. 11B, a vibration amplitude becomes greater when the engine rotational speed NE increases, because the increase of the engine rotational speed NE causes the pump rotational speed Np to increase, and thereby the valve-closing force is increased. In other words, the noise increases with the increase of the engine rotational speed. Furthermore, as shown in FIG. 11B, when the engine rotates at a low speed, the vibration amplitude is limited from increasing. More specifically, when the engine is idle or operated under the stand-by operation, the vibration does not deteriorate, and also the vibration does not quickly deteriorate immediately after the travel of the vehicle. Then, because the valve-closing force increases as shown in FIG. 11A when the pump rotational speed Np increases, the valve-closing timing of the inlet valve 58 advances. As a result, even if the energization time period Tv, which has been learned while the engine is operated at the low speed, is used for the engine at the high speed, failure of the discharge is limited from occurring. Due to the above reasons, the learning control may be performed when the engine rotational speed is equal to or less than the predetermined value.

(B) Relation between Engine Load and Learning Condition

Figure 12A:
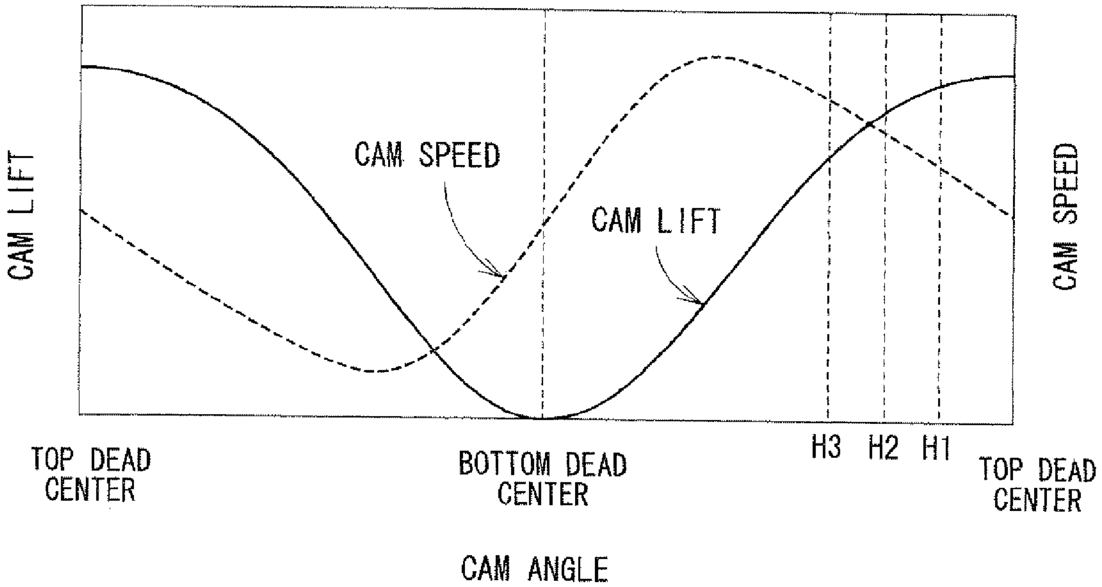
FIG. 12A is an explanatory diagram illustrating behavior of a cam lift and a cam speed.
Figure 12B:
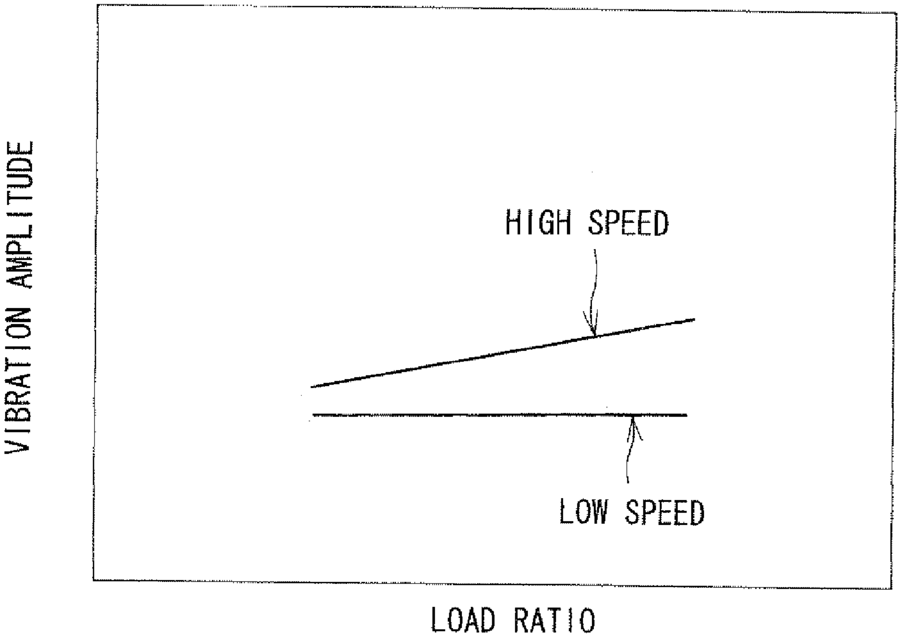
FIG. 12B is an explanatory diagram illustrating a relation between an engine load ratio and a vibration amplitude.

FIG. 12A is a diagram illustrating a cam speed, corresponding to a speed of the plunger 31, indicated by a dashed curved line, and the cam speed is overlapped on the cam lift of FIG. 4 indicated by a solid curved line. In FIG. 12A, cam angles employed in the operation with different engine load are indicated by H1, H2, and H3, More specifically, cam angle H1 corresponds to the lowest engine load, cam angle H2 corresponds to a second lowest engine load, and cam angle H3 corresponds to the highest engine load. As illustrated in FIG. 12A, the cam speed increases with an increase of the engine load. At the above case, FIG. 12B illustrates a relation between a load ratio of the engine and the vibration amplitude for one case, where the engine rotational speed NE is low and also illustrates the relation for another case, where the engine rotational speed NE is high. In a case, where the engine rotational speed NE is low, the vibration amplitude does not increase very much or the vibration amplitude remains almost the same even when the load becomes larger. Also, in a case, where the engine rotational speed NE is high, the vibration amplitude increases slightly when the load becomes greater. Also, even when the energization time period Tv, which is learned while the engine load is low, is used when the engine load is high, failure of the discharge is limited from occurring similar to the case of the above described engine rotational speed. Due to the above reasons, when the engine load is equal to or less than a predetermined value, the learning control may be executed.

As described in the above (A) and (B) relations, it may be appropriate to satisfy the learning condition when both the engine rotational speed and the engine load are equal to or less than the predetermined values.

Figure 13A:
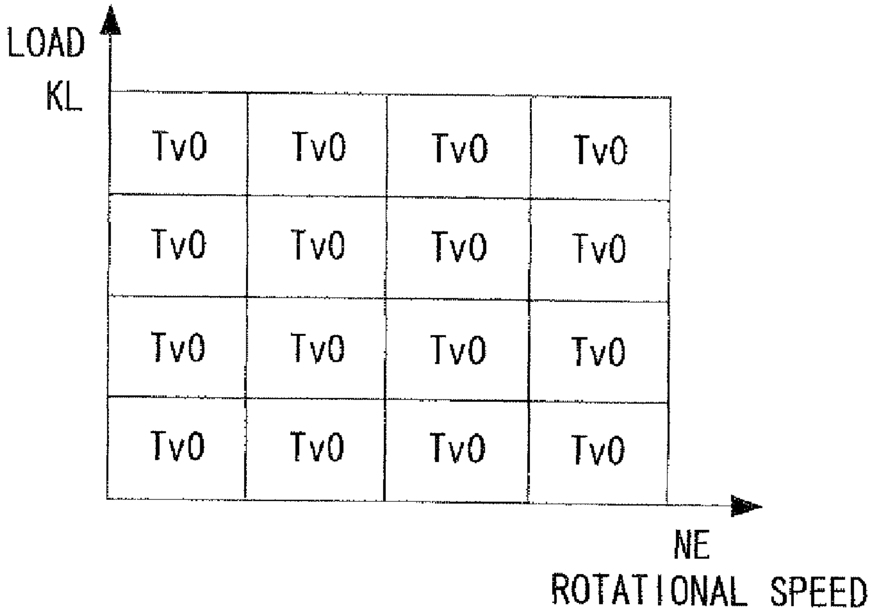
FIG. 13A is an explanatory diagram illustrating a learning control for each of operational ranges.

The satisfaction of the learning condition may be determined using the engine rotational speed and the engine load for each of multiple operational conditions of the engine. For example, as shown in FIG. 13A, the engine rotational speed NE may be categorized into one of four ranges, and the engine load KL may be categorized into one of four ranges. Thus, 16 operational ranges in total are prepared as a result of the above segmentation, and the learning operation is executed for each of the operational ranges. As a result, it is possible to set the energization time period Tv more appropriately.

Figure 13B:
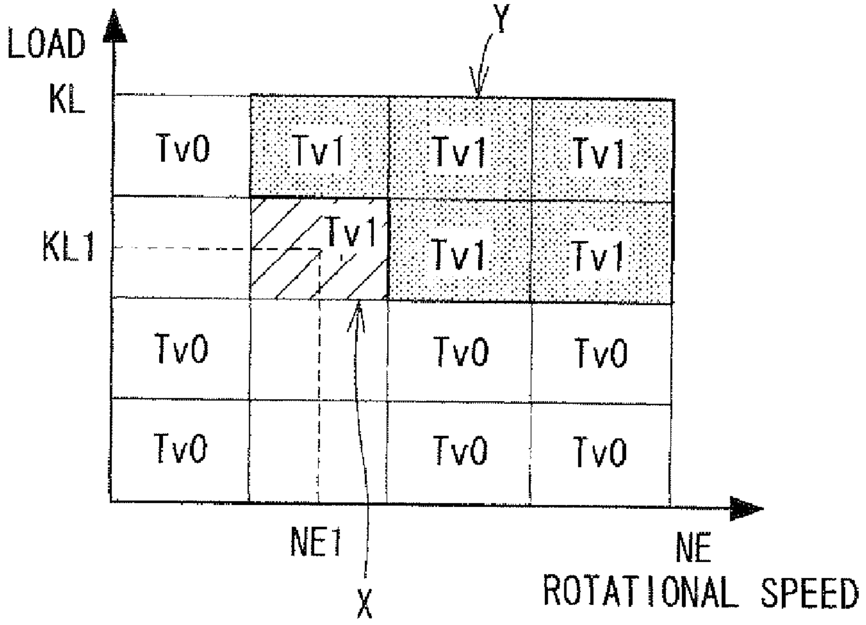
FIG. 13B is another explanatory diagram illustrating a learning control for each of operational ranges.

As above, even in a case, where the energization time period Tv, which is learned while the engine rotational speed is low, is used while the engine rotational speed is high, failure of the discharge is effectively limited from occurring. Also, even in another case, where the energization time period Tv, which is learned while the engine load is low, is used while the engine load is high, failure of the is effectively limited from occurring. As a result, in a configuration, where the learning operation is executed for each of the multiple operational conditions, a learning value, which is learned in one operational condition, may be used in another operational condition that is in a higher rotational range or in a higher load range compared with the one operational condition. Specifically, when the engine rotational speed is NE1 and the engine load is KL1, the learning operation is performed in an operational range X indicated by lined-hatching as shown in FIG. 13B. Thus, the learning value in the operational range X may be used in five other operational ranges Y indicated by dotted-hatching. The five other operational ranges Y are located on a side of the operational range X in a range higher in the rotational speed and higher in the load. In FIG. 13B, a learning value Tv1 is set for both the operational range X and the operational range Y.

Figure 14A:
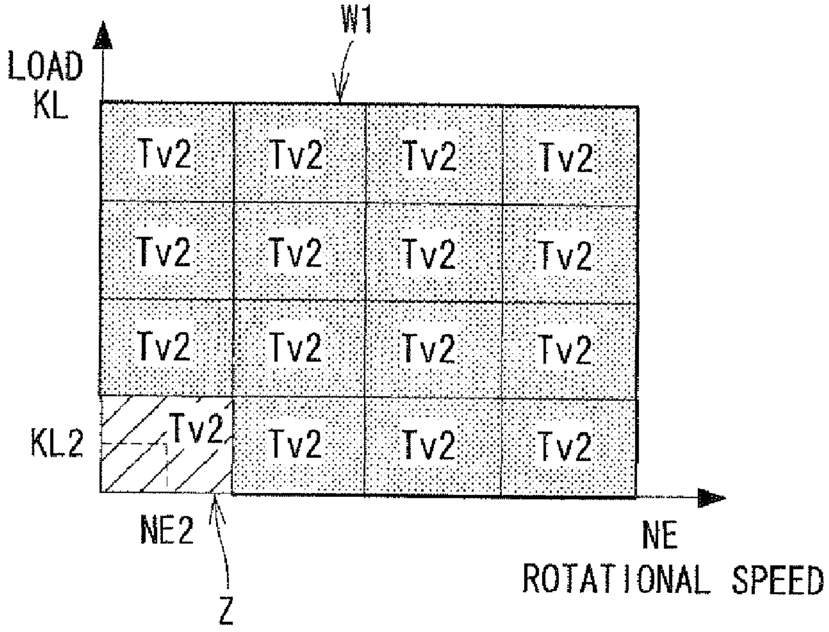
FIG. 14A is still another explanatory diagram illustrating a learning control for each of the operational ranges.

A learning operation executed under a further lower-speed and lower-load operational condition will be described with reference to FIGS. 14A and 14B. In one example case of the lower-speed and lower-load operational condition, the engine rotational speed NE indicates the engine rotational speed NE2 (FIGS. 14A, 14B) that is further smaller than the engine rotational speed NE1 (FIG. 13B), and the engine load KL indicates the engine load KL2 (FIGS. 14A, 14B) that is further smaller than the engine load KL1 (FIG. 13B).

In an operational range Z that corresponds to the above example case, a learning value may indicate Tv2, Because the learning value Tv2 is smaller than the learning value Tv1 normally, the learning value Tv2 may be used in 15 operational ranges W1 that is indicated by dotted-hatching. The operational ranges W1 are located on a side of the operational range Z in a range higher in the rotational speed and higher in the load as shown in FIG. 14A.

Figure 14B:
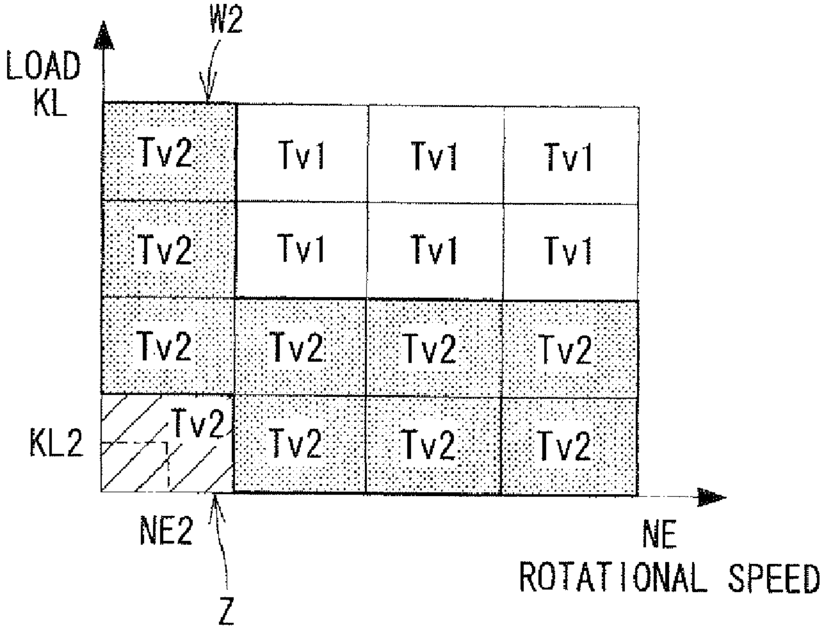
FIG. 14B is further another explanatory diagram illustrating a learning control for each of the operational ranges.

In contrast, if the learning value Tv2 is equal to or greater than the learning value Tv1, the learning value Tv2 may be used in alternative ranges W2 indicated by dotted-hatching in FIG. 14B. As shown in FIG. 14B, the ranges W2 include nine operational ranges that are located on a side of the operational range Z in a range higher rotational speed and higher in the load. Thus, the ranges W2 are part of the operational ranges W1 in FIG. 14A but are different from the other part of the operational ranges W1, which have the learning value Tv1.

As above, the execution of the learning operation for each of the operational conditions based on the engine rotational speed and the engine load has been described. However, when the satisfaction of the learning condition is determined using the engine coolant temperature as described in S220 in FIG. 10, the learning operation may be executed for each of multiple engine coolant temperatures. Specifically, multiple coolant temperature ranges may be set as follows, and the learning operation may be executed for each of the coolant temperature ranges.

Figure 15:
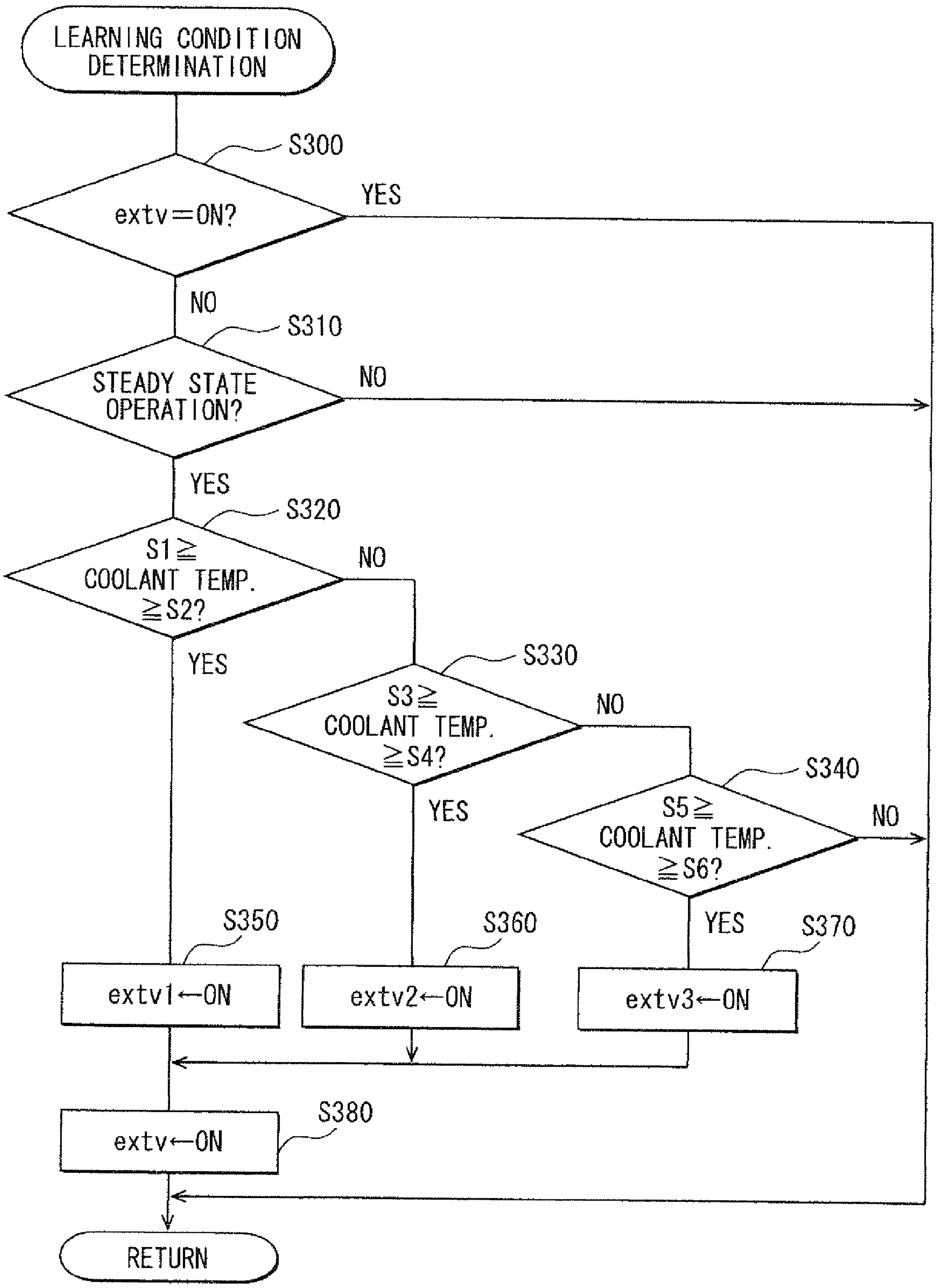
FIG. 15 is a flow chart illustrating a modification of the learning condition determination operation of the first embodiment of the present invention.

FIG. 15 is a flow chart illustrating a learning condition determination operation for determining whether the learning condition is satisfied for each of the engine coolant temperatures.

At S300, it is determined whether the learning flag extv is ON. The process at S300 is similar to that at S200 of FIG. 10. When it is determined that the learning flag extv is ON, corresponding to YES at S300, the following process will not be executed, and the learning condition determination operation is ended. In contrast, when it is determined that the learning flag extv is OFF, corresponding to NO at S300, control proceeds to S310.

At S310, it is determined whether the engine is operated under the steady state operation. The process at S310 is similar to that at S210 of FIG. 10. When it is determined that the engine is operated under the steady state operation, corresponding to YES at S310, control proceeds to S320. In contrast, when it is determined that the engine is not operated under the steady state operation, corresponding to NO at S310, the following process is not executed, and the learning condition determination operation is ended.

At S320, it is determined whether the engine coolant temperature is in a first range. In other words, it is determined at S320 whether the coolant temperature is equal to or higher than S2 and also is equal to or lower than S1 (S1≧coolant temperature≧S2). When it is determined that the coolant temperature is in the first range, corresponding to YES at S320, control proceeds to S350, where a coolant temperature condition flag extv1 is set as ON. Then, control proceeds to S380. In contrast, when it is determined that the coolant temperature is not in the first range, corresponding to NO at S320, control proceeds to S330.

At S330, it is determined whether the engine coolant temperature is in a second range. In other words, it is determined at S330 whether the engine coolant temperature is equal to or higher than S4 and also is equal to or lower than S3 (S3≧coolant temperature≧S4). When it is determined that the coolant temperature is in the second range, corresponding to YES at S330, control proceeds to S360, where a coolant temperature condition flag extv2 is set as ON, and then, control proceeds to S380. In contrast, when it is determined that coolant temperature is not in the second range, corresponding to NO at S330, control proceeds to S340.

At S340, it is determined whether the engine coolant temperature is in a third range. In other words, it is determined at S340 whether the engine coolant temperature is equal to or higher than S6 and also is equal to or lower than S5 (S5≧coolant temperature≧S6). When it is determined that the coolant temperature is in the third range, corresponding to YES at S340, control proceeds to S370, where a coolant temperature condition flag extv3 is set as ON, and then, control proceeds to S380. In contrast, when it is determined that the coolant temperature is not in the third range, corresponding to NO at S340, the learning condition determination operation is ended.

At S380, to which control proceeds from S350, S360, and S370, the learning flag extv is set as ON, and then the learning condition determination operation is ended. At S380, the learning flag extv is set as ON when the coolant temperature falls within one of the first to third ranges. Thus, the learning flag extv of ON indicates that the learning condition is satisfied.

In a case, where the above learning condition determination operation is performed, the processes at S120 to S150 indicated by the dashed line in the learning operation shown in FIG. 9 are executed for each of the coolant temperature ranges, such as the first range, the second range, and the third range. More specifically, a learning operation is performed to store the learning value when the coolant temperature condition flag extv1 is ON. Another learning operation is performed to store the learning value, when the coolant temperature condition flag ectv2 is ON. And still another learning operation is performed to store the learning value, when the coolant temperature condition flag extv3 is ON.

As detailed above, in the present embodiment, the second drive signal is changed to the low level at time T2, at which the movement of the needle 64 has not been completed (see FIG. 6). Due to the above, the travel speed of the needle 64 starts decreasing gradually after time T2. The above travel speed of the needle 64 corresponds to the inclination of a part indicated by K in FIG. 6. In other word, the needle 64 is capable of soft landing. As a result, for example, the movable core 68 is capable of soft landing on the surface of the stationary core 66, and thereby collision noise between the stationary core 66 and the movable core 68 is regulated. As a result, it is possible to effectively reduce the noise of the needle 64.

Also, in the present embodiment, the energization time period Tv is gradually shortened by repeating the process at S110 of FIG. 9, the learning operation is executed at S130 and S140, and then the energization time period Tv is set at S160. Due to the above, it is possible to appropriately set the energization time period Tv, and thereby it is possible to effectively reduce the noise of the needle 64. Furthermore, in the learning control, it is determined whether the fuel pressure is reduced at S120 of FIG. 9, and then the learning operation is executed at S130 and S140. As a result, it is possible to identify the lower limit value of the energization time period Tv, and thereby it is possible to appropriately set the energization time period Tv.

Furthermore, also, in the present embodiment, it is determined whether the engine is operated under the steady state operation, and further, the learning control is executed when the engine coolant temperature is equal to or greater than S0. By executing the learning control when the engine has been continuously operated under the steady state, it is possible to appropriately set the energization time period Tv. The above is done because the appropriate energization time period may change when the operational condition changes. In the present embodiment, it may be additionally determined whether the operational condition substantially changes. Thus, alternatively, the learning control may be ended when it is determined that the operational condition substantially changes during the execution of the learning control.

Also, in the present embodiment, the initial value of the energization time period Tv is set as the maximum value, and the energization time period Tv is gradually shortened in the learning control. Thus, it is possible to set the energization time period Tv to a value in order to avoid causing the failure in the discharge.

Also, as described with reference to FIG. 13A to FIG. 14B, the learning control is executed for each of the operational ranges. As a result, it is possible to appropriately set the energization time period Tv in accordance with various operational conditions, and thereby the noise of the needle 64 is effectively reduced. If the learning control is once executed for one operational range to obtain the energization time period Tv, the obtained energization time period Tv may be used in the other operational ranges located on a side of the one operational range in a range higher in the rotational speed and higher in the load (FIG. 13B, see FIG. 14). Then, it is not required to execute the learning control for all of the operational ranges advantageously.

Second Embodiment

The second embodiment of the present invention is different from the first embodiment in the learning control. In the present embodiment, parts of the embodiment that are different from the first embodiment will only be described, and thereby explanation of the similar configuration of the present embodiment similar to the first embodiment will be omitted. Also, similar components are indicated by the same numerals.

Figure 16:
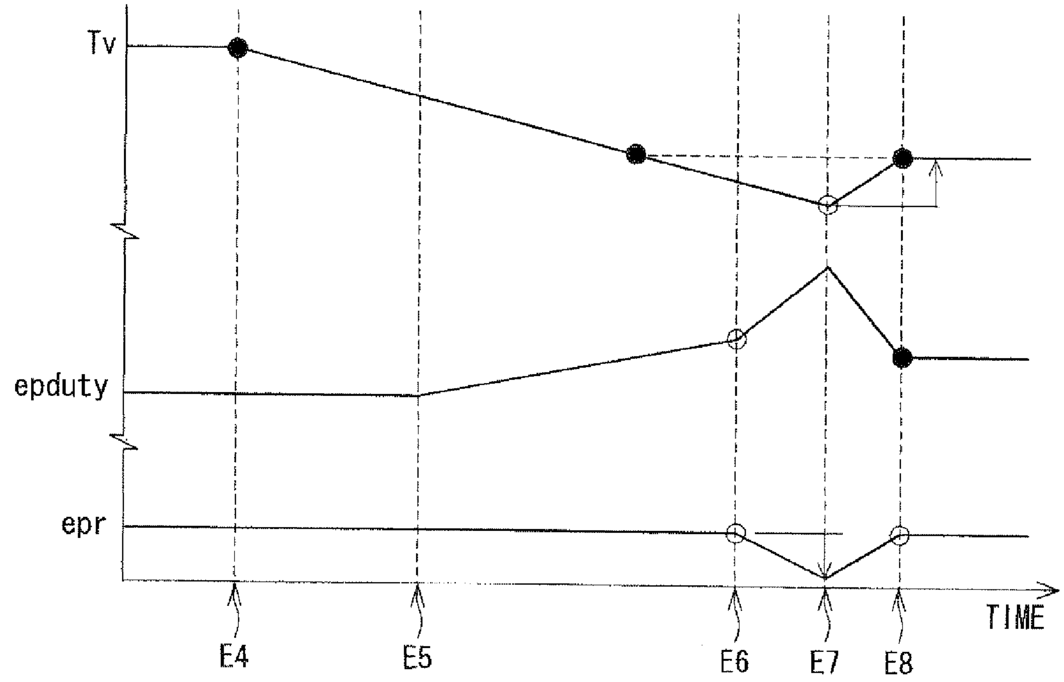
FIG. 16 is an explanatory diagram illustrating a learning control according to a second embodiment of the present invention.

Also in the present embodiment, as shown in FIG. 16, the energization time period Tv is gradually reduced from the initial value. The initial value at E4 corresponds to the maximum value of the energization time period Tv similar to the first embodiment, and the initial value may be set as the period from time t1 to time t4 shown in the comparison example of FIG. 5, for example.

The shortening of the energization time period Tv corresponds to the shortening of a certain time period, for which the second drive signal is kept at the high level and then changed to the low level after the certain time period has elapsed. Then, as described in the above explanation of FIG. 6, when the energization time period Tv is shortened, the valve-closing timing of the inlet valve 58 is delayed or retarded. Accordingly, the discharge amount is decreased, and thereby the spill valve closing timing epduty increases (E5 in FIG. 16).

In the first embodiment, when the fuel pressure (epr) actually starts decreasing (E2 in FIG. 8), the learning operation is executed based on increase Δepduty of the spill valve closing timing epduty. In contrast, in the present embodiment, when the fuel pressure reaches a predetermined value (E7) after the fuel pressure starts decreasing (E6 in FIG. 16), the energization time period Tv is set as a provisional learning value Tvpre. Then, a main the learning value Tvcal is computed by adding a predetermined time period to the provisional learning value Tvpre. The predetermined time period is determined such that the main the learning value Tvcal falls within a variable range of the energization time period Tv during a time period from E5 to E6 in FIG. 16.

In the present embodiment, the advantages achievable in the first embodiment are also achieved.

Third Embodiment

The third embodiment is different from the above embodiments in the learning control. In the present embodiment, parts of the embodiment that are different from the of the present embodiment similar to the above embodiments will be omitted. above embodiments will only be described, and thereby explanation of the similar configuration Also, similar components are indicated by the same numerals.

In the present embodiment, the fuel supply apparatus 100 includes a vibration sensor 105 that is indicated by a dashed line in FIG. 3. The vibration sensor 105 is provided to the stationary core 66 of the high-pressure pump 10 as indicated by a dashed line in FIG. 2 and detects vibration of the high-pressure pump 10. Alternatively, a knock sensor 105*a* may be provided to the cylinder 500 of the engine as indicated by a dashed line in FIG. 1 in order to detect the knock of the engine. The vibration sensor 105 outputs signals to the fuel pressure controller 103.

Figure 17:
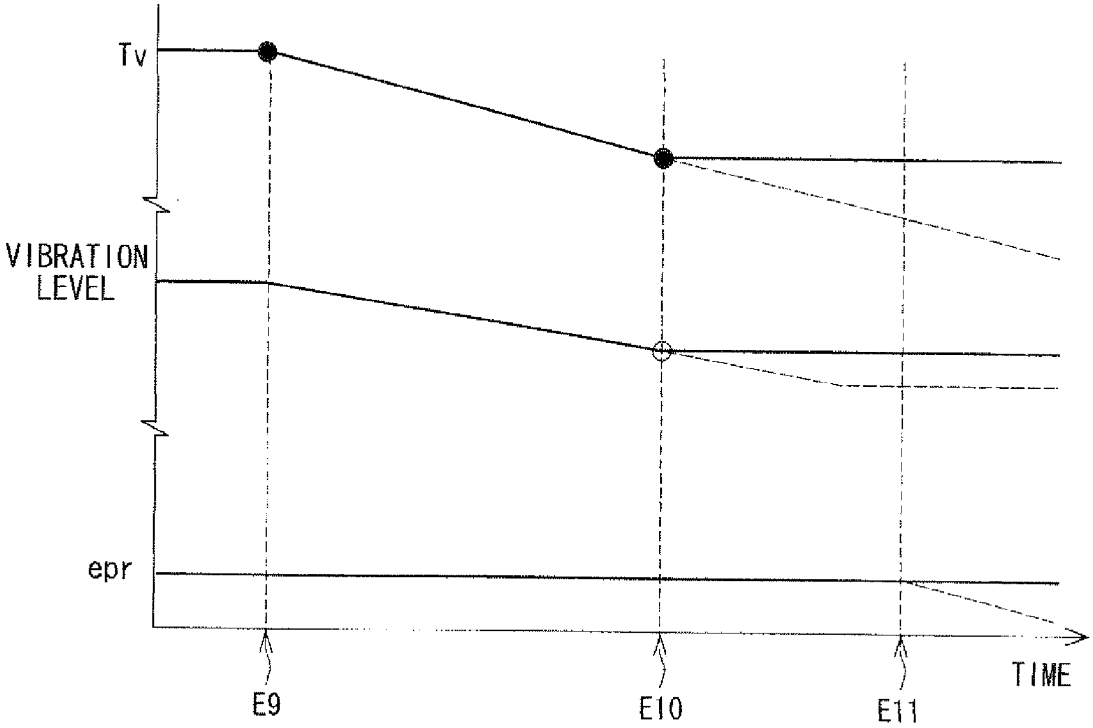
FIG. 17 is an explanatory diagram illustrating a learning control according to a third embodiment of the present invention.

In the present embodiment, as shown in FIG. 17, the energization time period Tv is gradually shortened from the initial value. The initial value corresponds to the maximum value of the energization time period Tv similar to the above embodiments. The initial value of the energization time period Tv at E9 may be, for example, the period from time t1 to time t4 of the comparison example of FIG. 5.

The shortening of the energization time period Tv corresponds to the gradually shortening of the certain time period, for which the second signal is kept at the high level and then the second signal is changed to the low level after the certain time period has elapsed. As shown in FIG. 7, when the energization time period Tv is reduced to become close to TvA, the vibration amplitude sharply decreases.

In the present embodiment, when a vibration level detected by the vibration sensor 105 is equal to or lower than a predetermined value, the learning value is set as the energization time period Tv at the time of detection (E10 in FIG. 17). It should be noted that as shown by a dashed line in FIG. 17, if the energization time period Tv were decreased continuously, the vibration level would be decreased to a certain level. Also, the fuel pressure (epr) would be also decreased (E11). Thus, the predetermined value used for determining the vibration level is set as a value that is limited from causing the decrease in the fuel pressure.

In the present embodiment, the advantages achievable in the above embodiments will be also achieved.

Fourth Embodiment

The fourth embodiment is different from the above embodiments in the learning control. In the present embodiment, parts of the embodiment that are different from the above embodiments will only be described, and thereby explanation of the similar configuration of the present embodiment similar to the above embodiments will be omitted. Also, similar components are indicated by the same numerals.

In the present embodiment, the fuel supply apparatus 100 includes an electric current sensor 106 indicated by a dashed line in FIG. 3. The electric current sensor 106 detects the drive electric current outputted by the drive circuit 104. The electric current sensor 106 outputs signals to the fuel pressure controller 103.

The drive electric current changes with a behavior of the needle 64 as shown by “d” in the comparison example in FIG. 5. More specifically, when the needle 64 is displaced to be closer to the closing-side position, the drive electric current decreases or drops. When the energization time period Tv is further shortened, the occurrence of the drop in the drive electric current is delayed.

In the present embodiment, when the delay of the drop d of the drive electric current detected by the electric current sensor 106 becomes equal to or greater than a predetermined value, the learning value is set as an energization time period Tv of the time of the detection. It should be noted that if the energization time period Tv were shortened further continuously, the needle 64 would not be able to reach the closing-side position or would not be attracted to be displaced to the closing-side position. As a result, the drop of the drive electric current is limited from occurring. However, the fuel pressure decreases accordingly. Thus, for example, the predetermined value used for determining the delay of the drop of the drive electric current is set in a magnitude that is limited from causing the decrease in the fuel pressure.

In the present embodiment, the advantages achievable in the above embodiments are also achieved.

It should be noted that, in the first to fourth embodiments, the fuel chamber 13 functions as a “receiver”, the inlet valve 58 functions as a “valve member”, the needle 64 and the movable core 68 function as a “movable unit”, the discharge valve unit 70 functions as a “discharge unit”, the fuel pressure sensor 102 functions as “fuel pressure detection portion”, the fuel pressure controller 103 functions as “drive control portion”, the drive circuit 104 functions as “drive circuit portion”, the vibration sensor 105 functions as “vibration detection portion", and the electric current sensor 106 functions as "electric current detection portion".

Other Embodiment in the first embodiment, it is determined at S120 in FIG. 9 whether the fuel pressure decreases, and then, the main learning operation is executed at S140 based on the increase Δepduty of the spill valve closing timing epduty. Alternatively, the provisional learning operation and the main learning operation may be executed based on the increase Δepduty of the spill valve closing timing epduty. Specifically, when the increase Δepduty exceeds the predetermined amount, the provisional learning operation is executed, for example, and the return value, which corresponds to a half of the increase (½×Δepduty), may be added to the provisional learning value. When the learning control is executed based on the spill valve closing timing epduty as above, the provisional learning operation may be omitted similar to the third embodiment, and the main learning operation may be executed when the increase Δepduty becomes equal to or greater than a predetermined amount.

In the above embodiments, the engine rotational speed, the engine load, and the engine coolant temperature are used as a parameter for defining the operational ranges for the operational condition. Alternatively, a temperature of an engine oil may be used as a parameter for the operational condition.

Also, the determination of whether the engine has been continuously operated under the steady state may be made based on the above operational condition. Alternatively, the determination of the operation under the steady state may be made whether at least one of a battery voltage, a fuel temperature, a fuel pressure, and a degree of viscosity of fuel is with in a predetermined range.

Also, a fuel pressure condition may be employed as the learning condition. For example, fuel pressure decreases in the learning control as in a case, where the decrease of the fuel pressure by a predetermined amount is detected in the second embodiment. Thus, the combustion may deteriorate accordingly. Thus, the learning condition may include that the fuel pressure is substantially high. Also, in the first and third embodiments, the learning condition may include that the fuel pressure is substantially high. In contrast, when the learning control is executed to obtain the energization time period while the fuel pressure is low, the obtained energization time period is also used for the operation under the high fuel pressure. Thus, in the first and third embodiments, the learning condition may include that the fuel pressure is low.

Figure 18A:
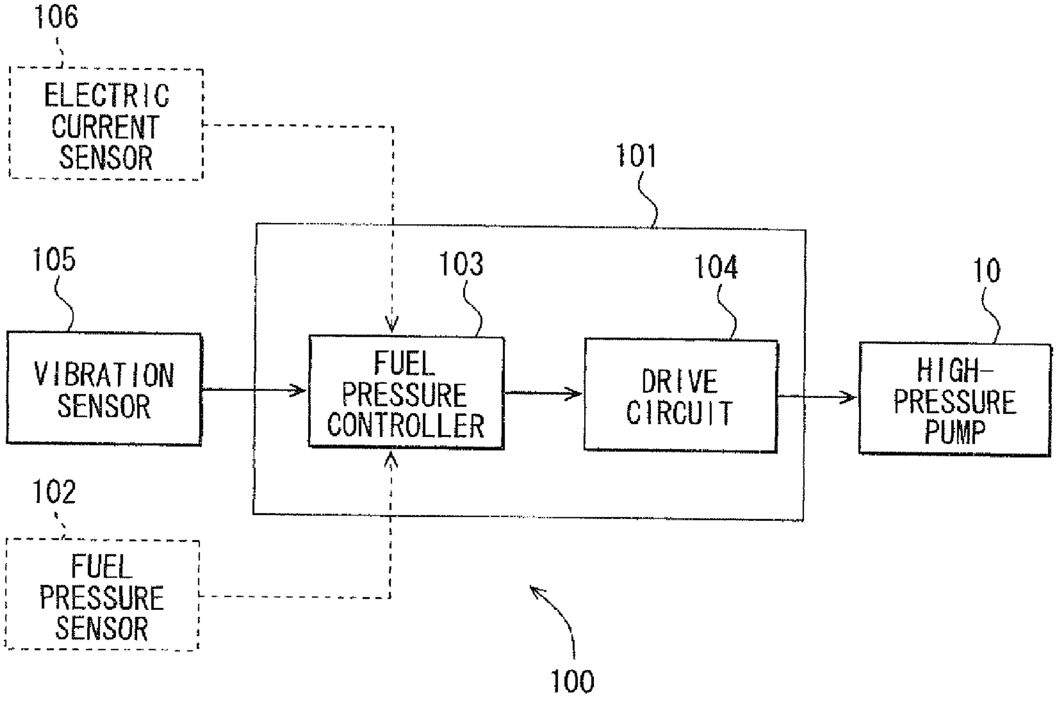
FIG. 18A is a block diagram illustrating a fuel supply apparatus according to the other embodiment of the present invention.
Figure 18B:
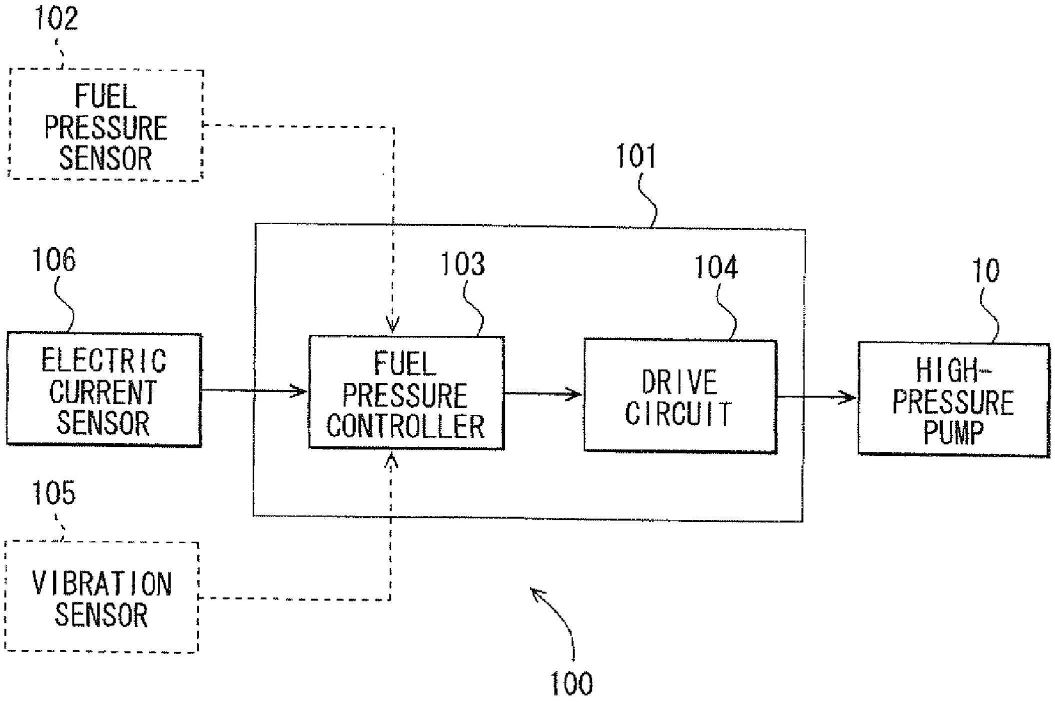
FIG. 18B is another block diagram illustrating a fuel supply apparatus according to the other embodiment of the present invention.

The fuel pressure sensor 102 is employed in the first and second embodiments, the vibration sensor 105 is employed in the third embodiment, and the electric current sensor 106 is employed in the fourth embodiment in order to executed the learning control. Alternatively, two or more of the above sensors 102, 105, 106 may be employed for the execution of the learning control. Also, one of the above sensors 102, 105, 106 may be mainly employed, and the other one or two sensors may be complementarily employed. More specifically, the fuel pressure sensor 102 is mainly used, and the vibration sensor 105 or the electric current sensor 106 may be complementarily used. Also, as shown in FIG. 18A, the vibration sensor 105 may be mainly used, and the electric current sensor 106 or the fuel pressure sensor 102 may be complementarily used. Also, as shown in FIG. 18B, the electric current sensor 106 is mainly used, and the fuel pressure sensor 102 or the vibration sensor 105 may be complementarily used.

The present invention is not limited to the above embodiments, and may be modified in various ways provided that the modification does not deviate from the gist of the present invention.

What is claimed is:

1. A fuel supply apparatus mounted on a vehicle comprising:

a receiver that receives fuel from an exterior;

a fuel passage that is communicated with the receiver;

a valve member that is provided in the fuel passage;

a pressurizer chamber that is located downstream of the fuel passage, the pressurizer chamber receiving fuel and compressing fuel in the pressurizer chamber;

a discharge unit that discharges fuel compressed in the pressurizer chamber;

a movable unit that is contactable with the valve member, the movable unit being displaceable between a closing-side position and an opening-side position;

a coil that generates a magnetic attractive force attracting the movable unit;

a drive circuit portion adapted to energize the coil with a drive electric current such that the coil generates the magnetic attractive force, wherein:

the drive circuit portion energizes the coil with the drive electric current of a first value such that the movable unit is displaced from the opening-side position to the closing-side position; and the drive circuit portion energizes the coil with the drive electric current of a second value that is smaller than the first value such that the movable unit is held at the closing-side position;

a drive control portion adapted to control the drive circuit portion to change the drive electric current from the first value to the second value in order to displace the movable unit toward the closing-side position while the movable unit is being displaced toward the closing-side position based on energization of the coil with the drive electric current of the first value; and a fuel pressure detection portion adapted to detect pressure of fuel discharged through the discharge unit, wherein the drive control portion determines timing of controlling the drive circuit portion to start energizing the coil with the drive electric current of the first value in accordance with a decrease of the pressure detected by the fuel pressure detection portion, wherein:

when the pressure detected by the fuel pressure detection portion decreases, the drive control portion advances a timing of controlling the drive circuit portion to start energizing the coil with the drive electric current of the first value.

2. A fuel supply apparatus mounted on a vehicle comprising:

a receiver that receives fuel from an exterior;

a fuel passage that is communicated with the receiver;

a valve member that is provided in the fuel passage;

a pressurizer chamber that is located downstream of the fuel passage, the pressurizer chamber receiving fuel and compressing fuel in the pressurizer chamber;

a discharge unit that discharges fuel compressed in the pressurizer chamber;

a movable unit that is contactable with the valve member, the movable unit being displaceable between a closing-side position and an opening-side position;

a coil that generates a magnetic attractive force attracting the movable unit, a drive circuit portion adapted to energize the coil with a drive electric current such that the coil generates the magnetic attractive force, wherein:

the drive circuit portion energizes the coil with the drive electric current of a first value such that the movable unit is displaced from the opening-side position to the closing-side position; and the drive circuit portion energizes the coil with the drive electric current of a second value that is smaller than the first value such that the movable unit is held at the closing-side position;

a drive control portion adapted to control the drive circuit portion to change the drive electric current from the first value to the second value in order to displace the movable unit toward the closing-side position while the movable unit is being displaced toward the closing-side position based on energization of the coil with the drive electric current of the first value; and an electric current detection portion adapted to detect the drive electric current to the coil, wherein the drive control portion determines timing of controlling the drive circuit portion to start energizing the coil with the drive electric current of the first value in accordance with a decrease of the drive electric current detected by the electric current detection portion, wherein:

when the drive electric current detected by the electric current detection portion decreases, the drive control portion advances a timing of controlling the drive circuit portion to start energizing the coil with the drive electric current of the first value.

3. A fuel supply apparatus mounted on a vehicle comprising:

a receiver that receives fuel from an exterior;

a fuel passage that is communicated with the receiver;

a valve member that is provided in the fuel passage;

a pressurizer chamber that is located downstream of the fuel passage, the pressurizer chamber receiving fuel and compressing fuel in the pressurizer chamber;

a discharge unit that discharges fuel compressed in the pressurizer chamber a movable unit that is contactable with the valve member, the movable unit being displaceable between a closing-side position and an opening-side position;

a coil that generates a magnetic attractive force attracting the movable unit;

a drive circuit portion adapted to energize the coil with a drive electric current such that the coil generates the magnetic attractive force, wherein:

the drive circuit portion energizes the coil with the drive electric current of a first value such that the movable unit is displaced from the opening-side position to the closing-side position; and the drive circuit portion energizes the coil with the drive electric current of a second value that is smaller than the first value such that the movable unit is held at the closing-side position;

a drive control portion adapted to control the drive circuit portion to change the drive electric current from the first value to the second value in order to displace the movable unit toward the closing-side position while the movable unit is being displaced toward the closing-side position based on energization of the coil with the drive electric current of the first value; and a vibration detection portion adapted to detect vibration, wherein the drive control portion determines timing of controlling the drive circuit portion to start energizing the coil with the drive electric current of the first value in accordance with a decrease of vibration detected by the vibration detection portion, wherein the drive control portion executes a learning control for setting a first energization time period, during which the drive circuit portion keeps energizing the coil with the drive electric current of the first value, by gradually shortening the first energization time period, and wherein when the vibration detected by the vibration detection portion becomes equal to or lower than a predetermined value while the drive control portion gradually shortens the first energization time period in the learning control, the drive control portion sets a learning value of the first energization time period as the first energization time period at the time of detection.

4. A fuel supply apparatus mounted on a vehicle comprising:

a receiver that receives fuel from an exterior;

a fuel passage that is communicated with the receiver;

a valve member that is provided in the fuel passage, a pressurizer chamber that is located downstream of the fuel passage, the pressurizer chamber receiving fuel and compressing fuel in the pressurizer chamber;

a discharge unit that discharges fuel compressed in the pressurizer chamber;

a movable unit that is contactable with the valve member, the movable unit being displaceable between a closing-side position and an opening-side position;

a coil that generates a magnetic attractive force attracting the movable unit;

a drive circuit portion adapted to energize the coil with a drive electric current such that the coil generates the magnetic attractive force, wherein:

the drive circuit portion energizes the coil with the drive electric current of a first value such that the movable unit is displaced from the opening-side position to the closing-side position; and the drive circuit portion energizes the coil with the drive electric current of a second value that is smaller than the first value such that the movable unit is held at the closing-side position;

a drive control portion adapted to control the drive circuit portion to change the drive electric current from the first value to the second value in order to displace the movable unit toward the closing-side position while the movable unit is being displaced toward the closing-side position based on energization of the coil with the drive electric current of the first value; and a fuel pressure detection portion adapted to detect pressure of fuel discharged through the discharge unit, wherein the drive control portion determines timing of controlling the drive circuit portion to start energizing the coil with the drive electric current of the first value in accordance with a decrease of the pressure detected by the fuel pressure detection portion, wherein:

the drive control portion executes a learning control for setting a first energization time period, during which the drive circuit portion keeps energizing the coil with the drive electric current of the first value, by gradually shortening the first energization time period.

5. The fuel supply apparatus according to claim 4, wherein:

the drive control portion executes the learning control for setting the first energization time period based on a change of the timing of controlling the drive circuit portion to start energizing the coil.

6. The fuel supply apparatus according to claim 4, wherein: the drive control portion executes the learning control for setting the first energization time period for each of a plurality of operational ranges that correspond to an operational condition of the vehicle.

7. The fuel supply apparatus according to claim 6, wherein: the drive control portion executes the learning control for setting the first energization time period of a first value for one of the plurality of operational ranges;

the drive control portion also sets the first energization time period of the first value for the other one of the plurality of operational ranges without executing the learning control; and the other one of the plurality of operational ranges is associated with the first energization time period of a second value that is smaller than the first value.

8. The fuel supply apparatus according to claim 4, wherein: the drive control portion executes the learning control when the vehicle has been continuously operated under a steady operational state.

9. The fuel supply apparatus according to claim 4, wherein: the drive control portion stops executing the learning control when an operational condition of the vehicle changes while the drive control portion executes the learning control.

10. The fuel supply apparatus according to claim 4, wherein:

the drive control portion executes the learning control by gradually shortening the first energization time period from an initial value; and the initial value corresponds to an energization time period, during which the drive circuit portion is required to energize the coil with the drive electric current of the first value such that the movable unit is displaced from the opening-side position to the closing-side position.

11. The fuel supply apparatus according to claim 1, wherein the drive control portion controls the drive circuit portion to change the drive electric current from the first value to the second value at a time at which displacement of the movable unit toward the closing-side position has not been fully completed.

* * * * *